(12) United States Patent
Samuelsson et al.

(10) Patent No.: US 9,848,203 B2
(45) Date of Patent: *Dec. 19, 2017

(54) DECODING AND ENCODING OF PICTURES OF A VIDEO SEQUENCE

(71) Applicant: Telefonaktiebolaget L M Ericsson (publ), Stockholm (SE)

(72) Inventors: Jonatan Samuelsson, Stockholm (SE); Rickard Sjöberg, Stockholm (SE)

(73) Assignee: TELEFONAKTIEBOLAGETG L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,173

(22) Filed: May 31, 2017

(65) Prior Publication Data

US 2017/0264916 A1 Sep. 14, 2017

Related U.S. Application Data

(63) Continuation of application No. 14/801,142, filed on Jul. 16, 2015, now Pat. No. 9,706,225, which is a (Continued)

(51) Int. Cl.
*H04N 19/31* (2014.01)
*H04N 19/587* (2014.01)
(Continued)

(52) U.S. Cl.
CPC ......... *H04N 19/587* (2014.11); *H04N 19/152* (2014.11); *H04N 19/31* (2014.11);
(Continued)

(58) Field of Classification Search
CPC ........... H04N 13/0003; H04N 13/0022; H04N 13/0033; H04N 13/007; H04N 13/0239;
(Continued)

(56) References Cited

U.S. PATENT DOCUMENTS 7,886,201 B2    2/2011   Shi et al.
7,894,523 B2    2/2011   Jeon et al.
(Continued)

FOREIGN PATENT DOCUMENTS

EP    2 265 028 A2    12/2010
JP    5820551 B1    11/2015
(Continued)

OTHER PUBLICATIONS

Decision of Grant corresponding to Russian Patent Application No. 2015121357 (10 pages) (dated Feb. 15, 2017).
(Continued)

*Primary Examiner* — Jay Patel
*Assistant Examiner* — Salame Amr
(74) *Attorney, Agent, or Firm* — Sage Patent Group

(57) ABSTRACT

The embodiments reduce output delay for pictures by determining after a current picture has been decoded and stored in a decoded picture buffer, DPB, a number of pictures in the DPB that are marked as needed for output. This number is compared, after a current picture has been decoded and stored in the DPB, against a value derived form at least one syntax element present or to be present in a bitstream representing pictures of a video sequence. If this number is greater than the value a picture, which is the first picture in output order, of the pictures in the DPB that are marked as needed for output is preferably output and marked as not needed for output.

23 Claims, 16 Drawing Sheets

Related U.S. Application Data continuation of application No. 14/116,071, filed as application No. PCT/EP2013/070093 on Sep. 26, 2013, now Pat. No. 9,407,932.

(60) Provisional application No. 61/706,869, filed on Sep. 28, 2012.

(51) Int. Cl.
| | | |
|---|---|---|
| *H04N 19/503* | (2014.01) | |
| *H04N 19/70* | (2014.01) | |
| *H04N 19/44* | (2014.01) | |
| *H04N 19/597* | (2014.01) | |
| *H04N 19/152* | (2014.01) | |
| *H04N 19/85* | (2014.01) | |
| *H04N 19/423* | (2014.01) | |

(52) U.S. Cl.
CPC ........... *H04N 19/423* (2014.11); *H04N 19/44* (2014.11); *H04N 19/503* (2014.11); *H04N 19/597* (2014.11); *H04N 19/70* (2014.11); *H04N 19/85* (2014.11)

(58) Field of Classification Search
CPC ........... H04N 13/0257; H04N 13/0425; H04N 13/0438; H04N 13/0484; H04N 13/0497; H04N 13/0404; H04N 2213/008; H04N 2213/002
USPC .................................................... 375/240.12
See application file for complete search history.

(56) References Cited

U.S. PATENT DOCUMENTS

| | | |
|---|---|---|
| 7,991,236 B2 | 8/2011 | Guo et al. |
| 9,124,891 B2 | 9/2015 | Jeon et al. |
| 2010/0080290 A1 | 4/2010 | Mehrotra |
| 2010/0098163 A1 | 4/2010 | Chiu et al. |
| 2011/0235709 A1 | 9/2011 | Shi et al. |
| 2012/0147973 A1 | 6/2012 | Wu et al. |
| 2013/0003864 A1 | 1/2013 | Sullivan |
| 2014/0086336 A1 | 3/2014 | Wang |

FOREIGN PATENT DOCUMENTS

| | | |
|---|---|---|
| RU | 2 374 787 C2 | 11/2009 |
| RU | 2 414 092 C2 | 3/2011 |
| RU | 2 506 710 C2 | 2/2014 |
| WO | WO 2013/002700 A1 | 1/2013 |

OTHER PUBLICATIONS

First Office Action with English language translation, Chinese Patent Application No. 201380050705.8, dated Oct. 23, 2015.

Office Action and English language summary, JP Application No. 2015-097696, dated Aug. 1, 2016.

Office Action corresponding to Russian Patent Application No. 2015115939 (4 pages) (dated Jan. 25, 2016).

Office Action corresponding to U.S. Appl. No. 14/116,071 (21 pages) dated Apr. 12, 2016).

B. Bross et al.: "Proposed Editorial Improvements for High efficiency video coding (HEVC) Text Specification Draft 8"; JCT-VC OF ITU-T SG16 W P3 and ISO/IEC JTC1/SC29/WG11 11th Meeting, Shaghai, CN, Oct. 10-19, 2012. Document: JCTVC-K0030_v3 Published Sep. 12, 2012; 276 pages.

B. Bross et al.: "High efficiency video coding (HEVC) text specification draft 8"; JCT-VC of ITU-T SG16 WP3 and ISO/IEC JTC1/SC29/WG11 10$^{th}$ Meeting, Stockholm, SE, Jul. 11-20, 2012. Document: JCTVC-J1003_d2. Published Sep. 12, 2012; 289 pages.

R. Sjöberg et al.: "Absolute signaling of reference pictures", Joint Collaborative Team on Video Coding (JCT-VC) of ITU-T SG16 WP3 and ISO/IEC JTC1/SC29/WG11 6$^{th}$ Meeting: Torino, 2011; Document JCTVC-F493 WG11 No. m20923; 10 pages.

Y-K Wang et al: "MVC HRD and bitstream restriction", 27. JVT Meeting;Apr. 6-10, 2008: Geneva , CH, (Joint Video Team of ISO/IEC JTC1/SC29NVG11 and ITU-T SG.16), No. JVT-AA020, Apr. 28, 2008, XP030007363, ISSN: 0000-0091, 19 pages.

G. Sullivan: "Proposed constraint on reordering latency (for further consideration of JCTVC-F541", Joint Collaborative Team on Video Coding (JCT-VC) of ITU-T SG16 WP3 and ISO/IEC JTC1/SC29/WG11 7$^{th}$ Meeting: Geneva, CH; Nov. 21-30, 2011; Document JCTVC-G779; 5 pages.

R. Sjöberg et al.: "Early bumping", Joint Collaborative Team on Video Coding (JCT-VC) of ITU-T SG16 WP3 and ISO/IEC JTC1/SC29/WG11 11th Meeting: Shanghai, CN, Oct. 10-19, 2012; Document JCTVC-K0214_r1; 3 pages.

J. Samuelsson et al.: "Reducing output delay for "bumping" process", Joint Collaborative Team on Video Coding (JCT-VC) of ITU-T SG16 WP3 and ISO/IEC JTC1/SC29/WG11 7$^{th}$ Meeting: Geneva, Ch, Nov. 21-30, 2011; Document JCTVC-G583; 5 pages.

J. Samuelsson et al.: "AHG15: Syntax controlled output process", Joint Collaborative Team on Video Coding (JCT-VC) of ITU-T SG16 WP3 and ISO/IEC JTC1/SC29NVG11 8$^{th}$ Meeting: San Jose, CA, USA, Feb. 1-10, 2012; Document JCTVC-H0567; 9 pages.

International Search Report, Application No. PCT/EP2013/070093, dated Dec. 4, 2013.

Written Opinion of the International Preliminary Examining Authority, PCT Application No. PCT/EP2013/070093, dated Sep. 2, 2014.

International Preliminary Report on Patentability, PCT Application No. PCT/EP2013/070093, dated Feb. 3, 2015.

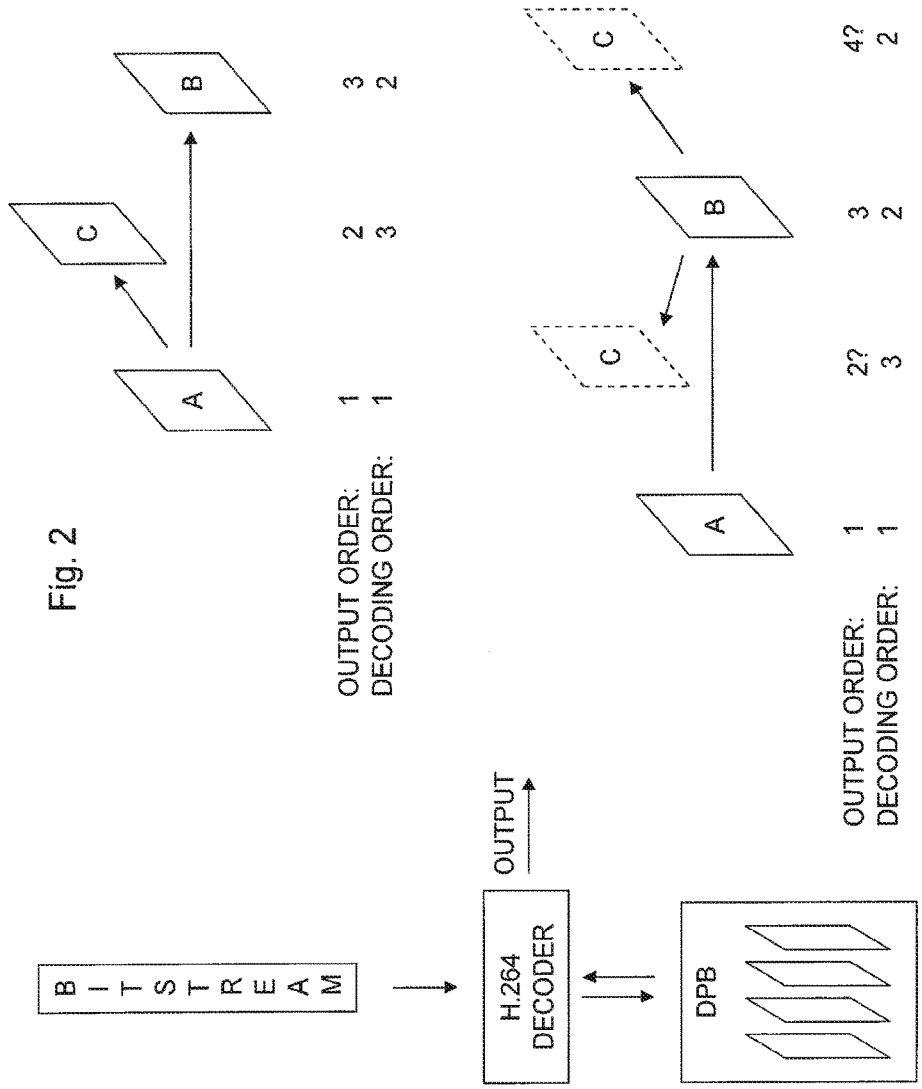

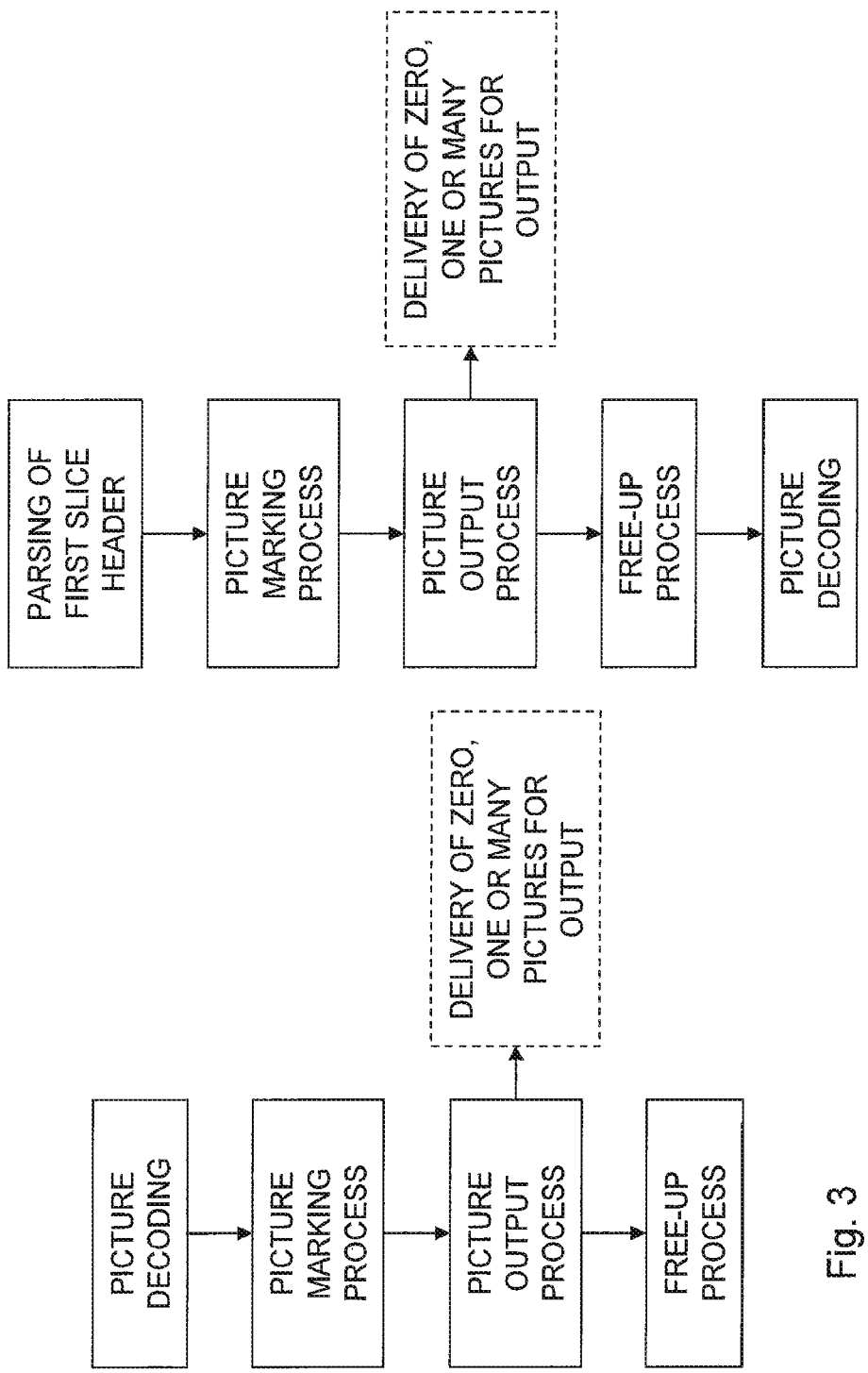

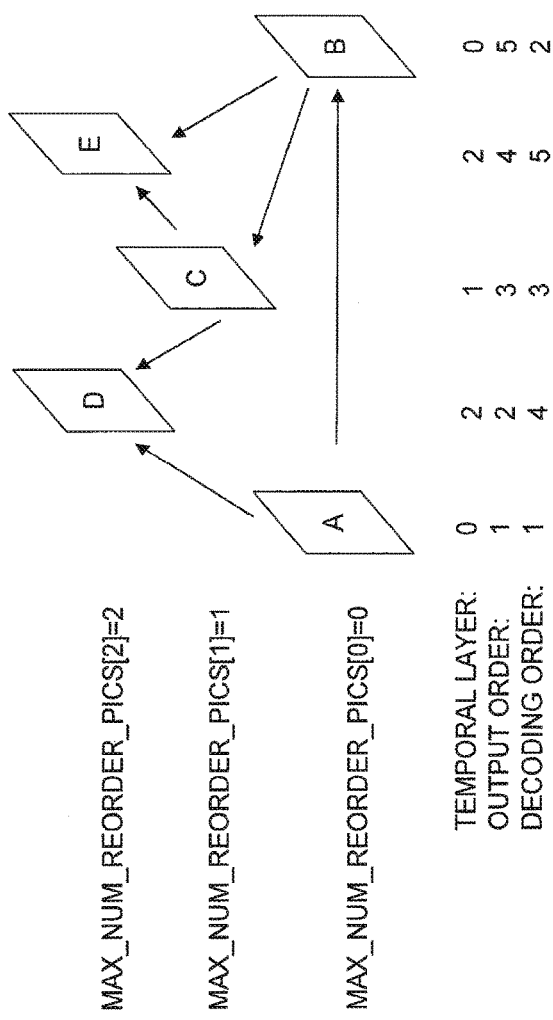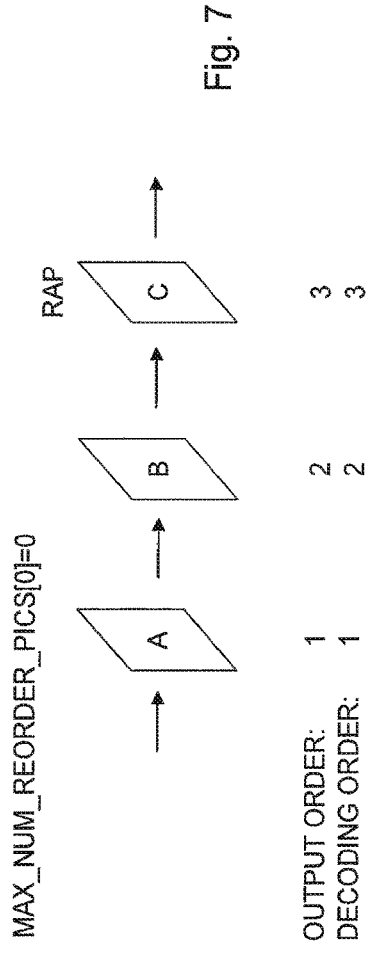

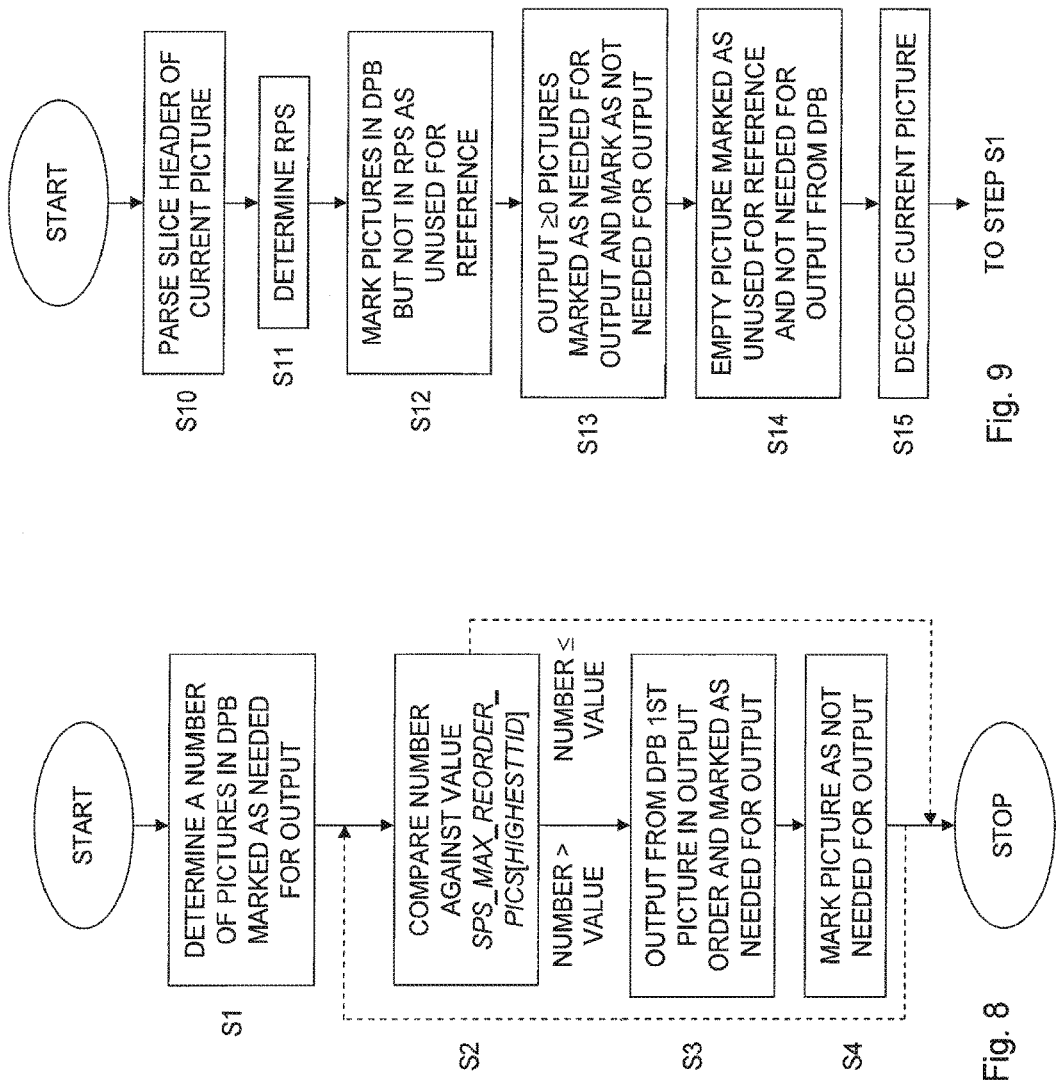

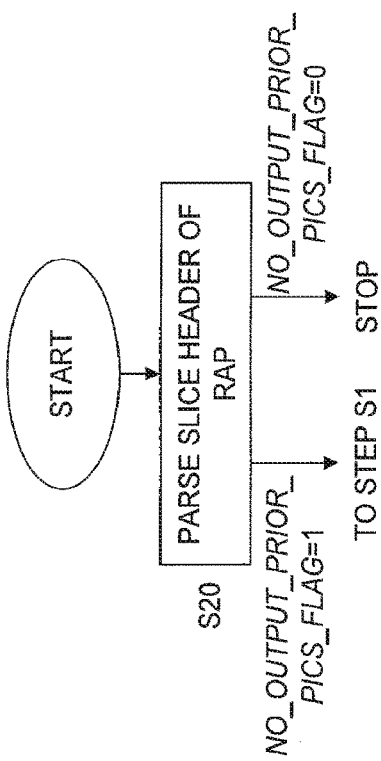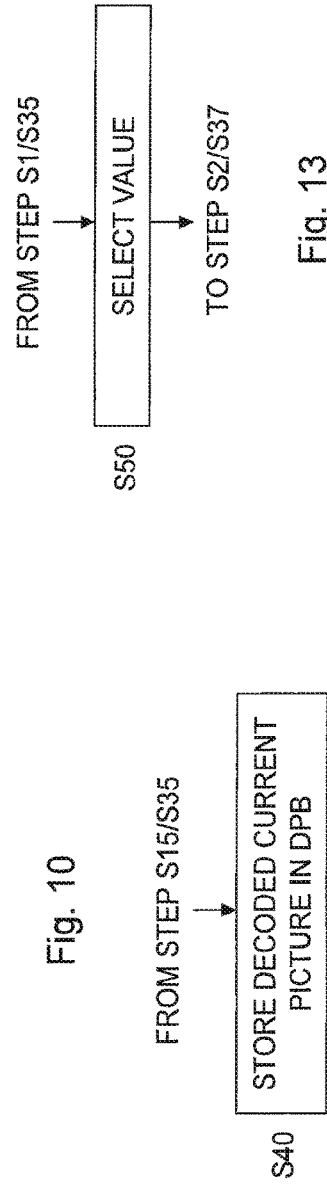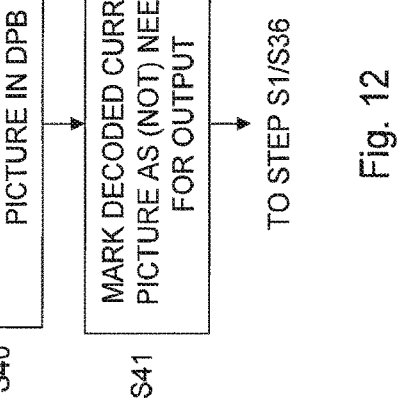

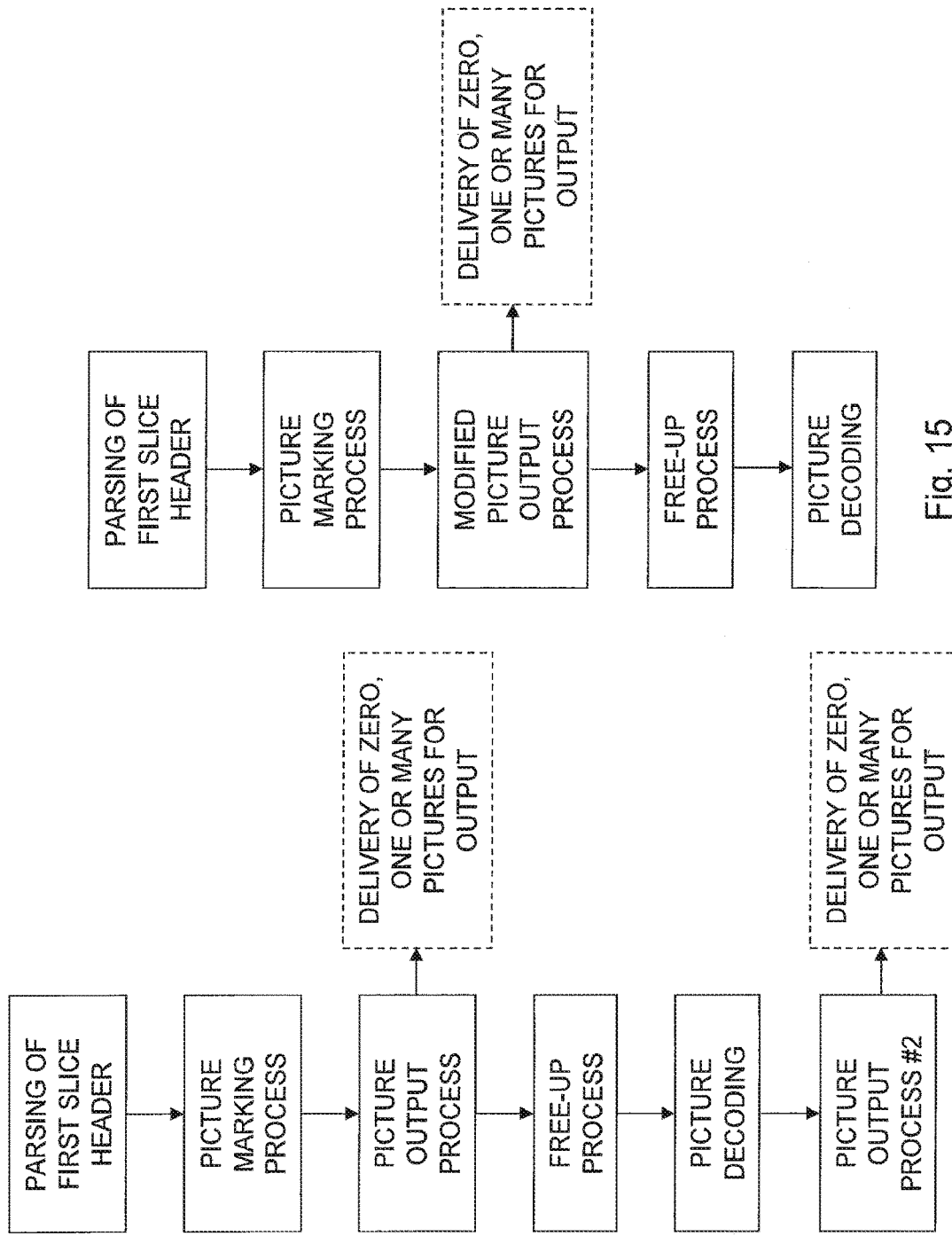

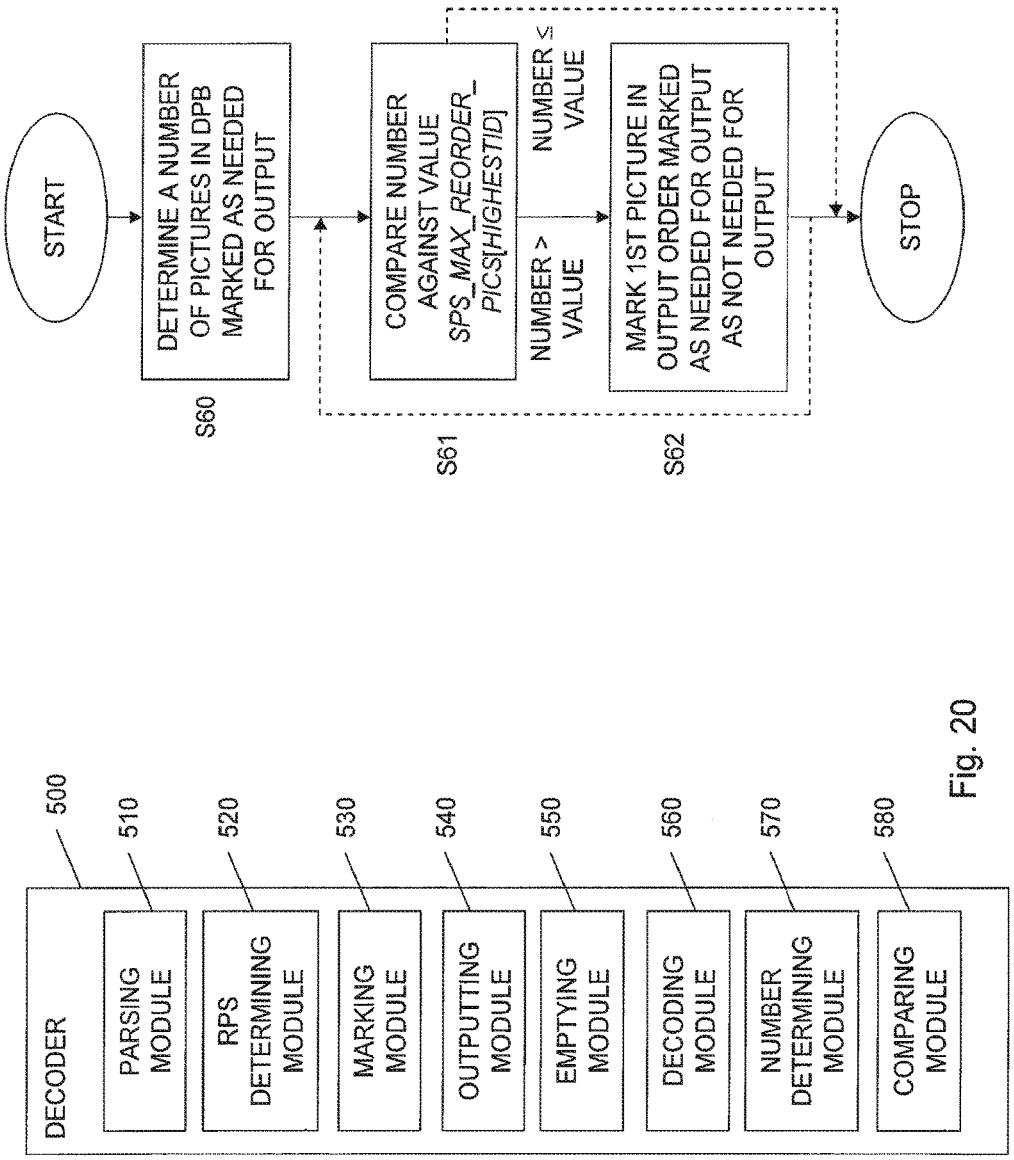

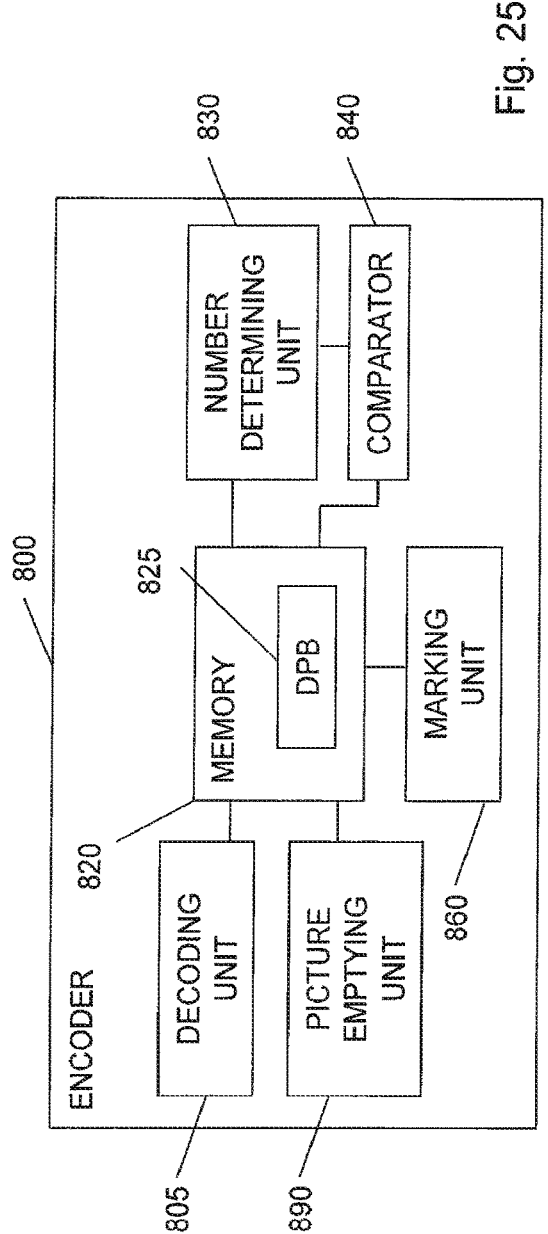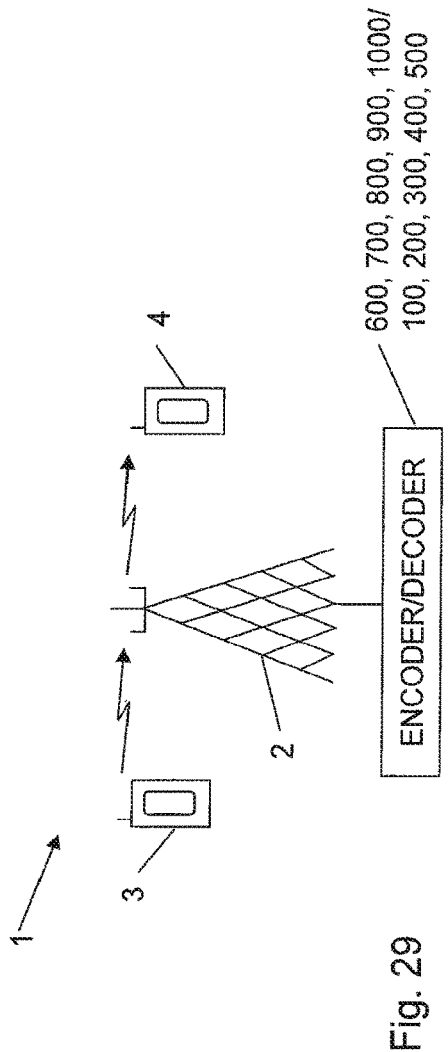

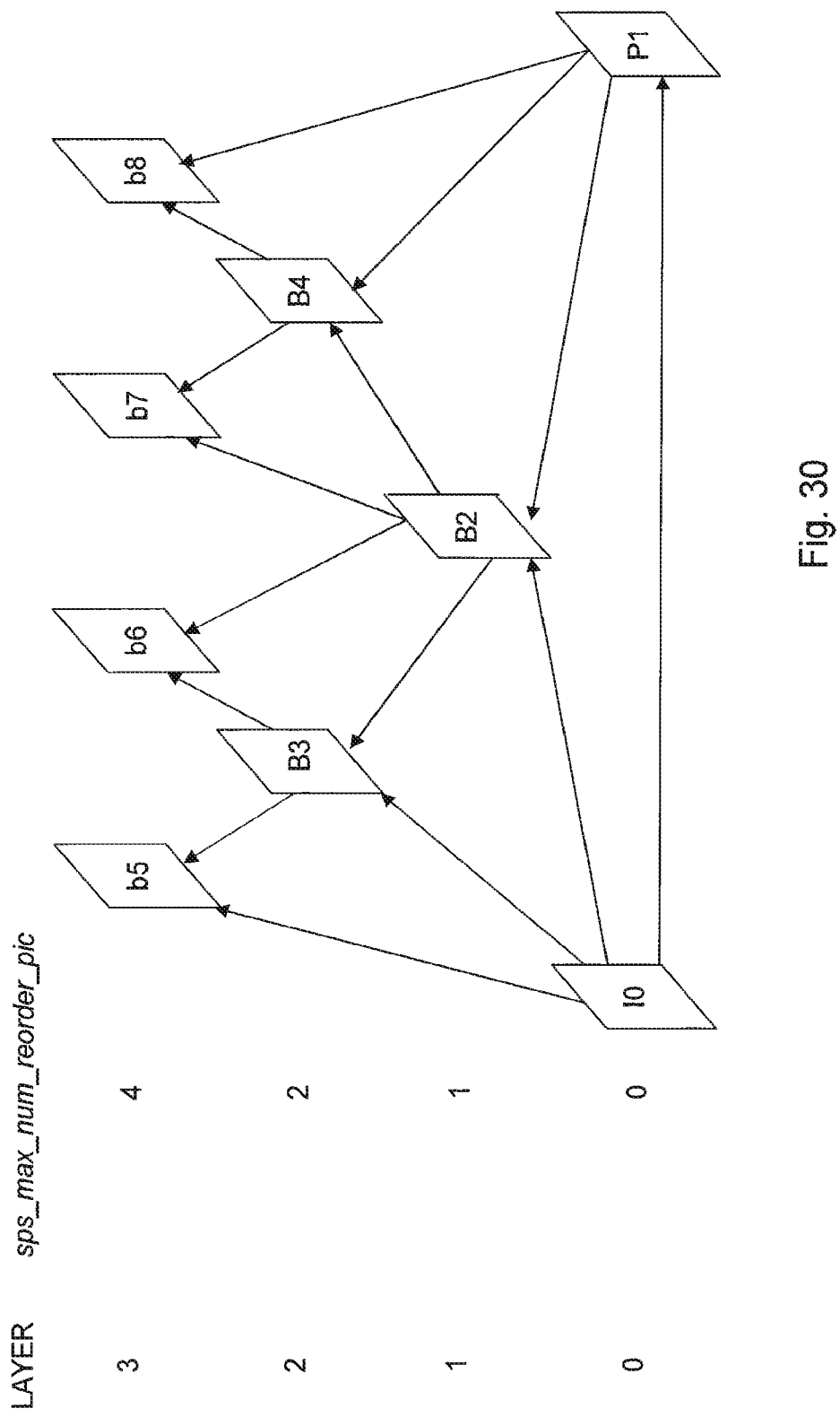

DECODING AND ENCODING OF PICTURES OF A VIDEO SEQUENCE

CROSS REFERENCE TO RELATED APPLICATIONS

This application is a continuation of U.S. patent application Ser. No. 14/801,142, filed Jul. 16, 2015, which itself is a continuation of U.S. patent application Ser. No. 14/116,071, filed Nov. 6, 2013 (now U.S. Pat. No. 9,407,932), which itself is a 35 U.S.C. §371 national stage application of PCT International Application No. PCT/EP2013/070093, filed on Sep. 26, 2013, which itself claims priority to U.S. Provisional Patent Application No. 61/706,869, filed Sep. 28, 2012, the disclosure and content of all of which are incorporated by reference herein in their entirety.

TECHNICAL FIELD

The present embodiments generally relate to decoding and encoding pictures of a video sequence, and in particular to outputting or bumping pictures from a decoded picture buffer in connection with decoding and encoding pictures.

BACKGROUND

H.264 Video Compression

H.264 (Moving Picture Experts Group-4 Advanced Video Coding (MPEG-4 AVC)) is the state of the art video coding standard. It consists of a block-based hybrid video coding scheme that exploits temporal and spatial redundancies. The H.264/AVC standard is defined in a specification text that contains many decoding processes that have to be executed in the specified sequence in order for a decoder to be compliant to the standard. There are no requirements on the encoder but it is often the case that the encoder also executes most of the processes in order to achieve good compression efficiency.

H.264/AVC defines a decoded picture buffer (DPB) that stores decoded pictures after they have been decoded. This means that the decoder is required to use a defined amount of memory in order to decode a sequence. The DPB contains pictures that are used for reference during decoding of future pictures. "Used for reference" here means that a particular picture is used for prediction when another picture is decoded. Pixel values of the picture that is used for reference may then be used to predict the pixel values of the picture that is currently decoded. This is also referred to as Inter prediction. The DPB additionally contains pictures that are waiting for output. "Output" here means the function where a decoder outputs a picture outside the decoder. The H.264 specification describes how a bitstream is converted into decoded pictures that are then output, see FIG. 1. The output pictures may e.g. be displayed or written to disk.

One common reason for a picture in the DPB to be waiting for output is that there is a picture that has not been decoded yet that will be output before the picture.

FIG. 2 shows an example of three pictures: A, B, and C. The decoding order is the order in which the pictures in compressed format are fed into the decoder. This is typically the same order in which the pictures are encoded by the encoder. FIG. 2 shows that the decoding order in this example is A, B and C. The output order is the order in which the decoded pictures are output. The output order does not have to be the same as the decoding order as is illustrated in the example in FIG. 2 where the output order is A, C, B. The arrows in the figure show which pictures that are used for reference for each picture: picture A is used for reference for both picture B and C.

In FIG. 2, picture C is decoded after B but output before it. When picture B has been decoded, it can not be output immediately since picture C has not been decoded yet and has to be output before picture B. Therefore, picture B has to be stored in the DPB after it has been decoded even if it is not used for reference by any other picture. When decoding picture C, picture A must also be present in the DPB since picture C uses picture A for reference.

Output order is controlled by signaling a PictureOrderCount (POC) value. There are syntax elements in the bitstream to convey the POC of every picture and these values are used in order to define the output order of pictures.

To keep track of the DPB, H.264/AVC contains three processes that take place after a picture has been decoded: the picture marking process, the picture output process and the free-up process.

The picture marking process marks pictures as either "used for reference" or "unused for reference". A picture marked as "used for reference" is available for reference which means that a subsequent picture in decoding order may use the picture for reference in its decoding processes. A picture narked as "unused for reference" cannot be used for reference by subsequent pictures. This process is controlled by the encoder through the bitstream. There is optional syntax in the H.264/AVC bitstream that when present indicates what pictures to mark as "unused for reference". This operation is often referred to as the memory management control operation (MMCO). If there is no optional MMCO syntax, a first-in, first-out mechanism is defined, called the "sliding window" process. The sliding window process means that when the last decoded picture would result in too many pictures in the DPB, the oldest picture in decoding order is automatically marked as "unused for reference".

The picture output process, which is done after the picture marking process, marks pictures as either "needed for output" or "not needed for output". A picture marked as "needed for output" has not been output yet while a picture marked as "not needed for output" has been output and is no longer waiting for output. The picture output process also outputs pictures. This means that the process selects pictures that are marked as "needed for output", outputs them and thereafter marks them as "not needed for output". The picture output process determines in which order pictures are output. Note that the picture output process may output and mark zero, one or many pictures after one particular picture has been decoded.

After these two processes have been invoked by the decoder the free-up process is invoked. Pictures that are marked both as "unused for reference" and "not needed for output" are emptied and removed from the DPB. This is sometimes referred to as one of the DPB picture slots has been made free.

The size of the DPB in H.264/AVC is limited. This means that the number of pictures that can be stored because they are waiting for output or made available for reference is limited. The variable max_dec_frame_buffering denotes the size of the DPB, sometimes referred to as the number of picture slots there are in the DPB. The encoder has to ensure that the DPB size never overflows.

The three processes are described in the standard. This means that the decoder is controlled by the encoder and therefore the decoder does not have any freedom regarding output order. It is all determined by the picture output process and the related elements in the bitstream sent by the encoder. A simplified flow chart for the decoding steps of H.264/AVC is shown in FIG. 3.

The picture output process in H.264 defines the order in which pictures shall be output. A decoder that outputs pictures in the correct order is output order compliant. A decoder may follow the picture output process described in H.264 but it is sometimes possible to use the variable num_reorder_frames to output pictures earlier than what is given by the picture output process. num_reorder_frames indicates the maximum number of pictures that precede any picture in decoding order and follow it in output order.

FIG. 4 shows an example where picture B has just been decoded. But picture B cannot be output since it is not known whether picture C is to be output before or after picture B. If the encoder has decided that the output order is the same as the decoding order, it can indicate a num_reorder_frames value of 0 to the decoder. The encoder has thereby promised that picture C in the example will be output after picture B and a decoder can output picture B immediately when it has been decoded. In this case, when num_reorder_frames is 0, there is no additional reordering delay in the decoder. If num_reorder_frames in the example is set to 1, it is possible that picture C is to be output before picture B. With num_reorder_frames equal to 1, there is an additional reordering delay of 1 picture, with num_reorder_frames is equal to 2, the reordering delay is 2 pictures and so on.

HEVC Video Compression

High Efficiency Video Coding (HEVC), also referred to as H.265, is a video coding standard developed in Joint Collaborative Team-Video Coding (JCT-VC). JCT-VC is a collaborative project between MPEG and International Telegraph Union Telecommunication Standardization Section (ITU-T). HEVC includes a number of new tools and is considerably more efficient than H.264/AVC. HEVC also defines a temporal_id for each picture, corresponding to the temporal layer the picture belongs to. The temporal layers are ordered and have the property that a lower temporal layer never depends on a higher temporal layer. Thus, higher temporal layers can be removed without affecting the lower temporal layers. The removal of temporal layers can be referred to as temporal scaling. An HEVC bitstream contains a syntax element, max_sub_layers_minus1, which specifies the maximum number of temporal layers that may be present in the bitstream. A decoder may decode all temporal layers or only decode a subset of the temporal layers. The highest temporal layer that the decoder actually decodes is referred to as the highest temporal sub-layer and may be set equal to or lower than the maximum numbers of layers as specified by max_sub_layers_minus1. The decoder then decodes all layers that are equal to or lower than the highest temporal sub-layer. The highest temporal sub-layer may be set by external means.

Note that the description above is not specific for temporal layers, but also holds for other types of layers such as spatial layers and quality layers, etc. The temporal layer that the decoder then decodes is referred to as the highest decoded layer.

The decoding flow of HEVC is slightly different to H.264/AVC. HEVC has a DPB, a picture marking process that marks pictures as "used for reference" and "unused for reference", a picture output process that marks pictures as "needed for output" and "not needed for output" and a free-up process. Like H.264/AVC, HEVC also uses POC values to define the picture output order. A POC value is in HEVC represented by the variable PicOrderCntVal, where pictures are output in increasing PicOrderCntVal order.

HEVC does, however, not have MMCO or sliding window process. Instead, HEVC specifies that a list of the pictures that are marked as "used for reference" is explicitly sent in each slice header. The picture marking in HEVC uses this list and ensures that all pictures in the DPB that are listed are marked as "used for reference" and that all pictures in the DPB that are not listed are marked as "unused for reference". The list is called the reference picture set (RPS) and sending one in each slice header means that the state of the reference marking in the DPB is explicit and repeated in each slice, which is not the case in H.264/AVC.

Since RPSs are used in HEVC, the picture marking process, the picture output process and the free-up process are all done after the parsing of the first slice header of a picture, see FIG. 5.

The num_reorder_frames functionality as described for H.264/AVC is also present in HEVC. An HEVC bitstream contains a syntax element for each temporal layer, denoted max_num_reorder_pics[i], where i is the temporal layer. The function of max_num_reorder_pics[i] is the same as num_reorder_frames but each codeword here indicates the maximum allowed number of pictures in the same or lower temporal layer that precedes a picture in decoding order and succeeding that picture in output order.

Consider the example in FIG. 6 where the decoding order is A, B, C, D, E and the output order is A, D, C, E, B. This is a structure of pictures that uses temporal layers where pictures A and B belong to the lowest temporal layer (layer 0), picture C belongs to a middle temporal layer (layer 1) and pictures D and E belong to the highest temporal layer (layer 2). The arrows in the figure show which pictures that are used for reference by other pictures. For example, picture A is used for reference by picture B since there is an arrow from picture A to picture B. Best use of max_num_reorder_pics in HEVC is to set it as low as possible to reduce the output delay as much as possible. The lowest possible values of max_num_reorder_pics for each temporal layer are shown in FIG. 6. The reason it is 0 for the lowest layer is because there is no picture in layer 0 that precedes any picture in decoding order but follows it in output order. For layer 1, we have picture B that precedes picture C in decoding order but follows it in output order, and for layer 2 we have pictures B and C that both precedes picture D in decoding order but follows it in output order.

If a decoder knows that it will only decode temporal layer 0, it could potentially output picture B as soon as it has been decoded but if the decoder decodes all layers it can not. It could then have to wait until there are two decoded pictures that follow B in output order.

JCTVC-K0030_v3, Proposed Editorial Improvement for High efficiency video coding (HEVC) Text Specification Draft 8, B. Bross et al., JCT-VC of ITU-T SG16 WP3 and ISO/IEC JTC1/SC29/WG11 11$^{th}$ Meeting, Shanghai, 10-19 Oct. 2012 as published on 12 Sep. 2012 discuses usage of max_num_reorder_pics in section 7.4.2.1 on page 62 and section 7.4.2.2 on page 64.

No_Output_of_Prior_Pics_Flag

Both H.264 and HEVC bitstream specifies a flag called no_output_of_prior_pics_flag. This flag is present in the slice header of random access pictures (RAP). Random access pictures are pictures from which it is possible to tune into a stream. They guarantee that decoding of future pictures can be done correctly if a decoder starts decoding from the random access point. The decoder does not have to be fed any data containing pictures that precede the random access picture in decoding order for tune-in to work.

The no_output_of_prior_pics_flag specifies how the previously-decoded pictures in the decoded picture buffer are treated after decoding of a random access picture. In short, if no_output_of_prior_pics_flag is equal to 1, no pictures in the DPB that are marked as "needed for output" should be output, but if no_output_of_prior_pics_flag is equal to 0 they should be output.

Consider FIG. 7 that shows an example where max_num_reorder_pics is 0 and picture C is a random access picture with no_output_of_prior_pics_flag equal to 1. In H.264, it would be possible to output picture B immediately after it has been decoded. This is not the case in the current HEVC specification since the decoder does not know immediately after picture B has been decoded whether picture C is a RAP picture with no_output_of_prior_pics_flag equal to 1 or not. If picture C is not such a picture, picture B could be output immediately after it has been decoded. But if picture C is indeed a RAP picture with no_output_of_prior_pics_flag equal to 1, picture B should not be output, since picture B is marked as "needed for output" when the slice header of picture C is decoded.

Since the picture output process in HEVC is done when the slice header is parsed and no_output_of_prior_pics_flag is an important feature, there is a higher output delay in the current HEVC standard than in H.264/AVC.

Information of usage of no_output_of_prior_pics_flag is disclosed in section 7.4.7.1 on page 75 and section C.5.2 on page 26 in JCTVC-K0030_v3.

The advantage by using RPSs in HEVC is that it is much more error resilient compared to the H.264/AVC method. Also, temporal scalability is more straightforward. A problem with the HEVC solution is that it introduces additional delay regarding picture output compared to H.264/AVC. In H.264/AVC, pictures can be output after a picture has been decoded. In HEVC, the decoder has to wait for the slice header of the next picture to be parsed until pictures are output. This causes a delay.

Hence, there is a need to solve the shortcomings of the prior art video coding and in particular delay problems that may occur in the video coding of the prior art.

SUMMARY

It is a general objective to provide an improved decoding and encoding of pictures of a video sequence.

It is a particular objective to provide such a decoding and encoding that enables low output delay for pictures.

These and other objectives are met by embodiments as disclosed herein.

An aspect of the embodiments relates to a method performed by a decoder. The method comprises determining, after a current picture has been decoded and stored in a decoded picture buffer (DPB), a number of pictures in the DPB that are marked as needed for output. The method also comprises comparing the number against a value sps_max_num_reorder_pics[HighestTid]. HighestTid specifies a highest layer that is decoded by the decoder of a video sequence. The method further comprises outputting a picture, which is a first picture in output order of the pictures in the DPB that are marked as needed for output, if the number is greater than the value. The picture is also marked as not needed for output if the number is greater than the value.

A related aspect of the embodiments defines a decoder configured to determine, after a current picture of a bitstream representing pictures of a video sequence has been decoded and stored in a DPB, a number of pictures in the DPB that are marked as needed for output. The decoder is also configured to compare the number against a value sps_max_num_reorder_pics[HighestTid]. The decoder is further configured to output a picture, which is a first picture in output order, of the pictures in the DPB that are marked as needed for output and mark the picture as not needed for output if the number is greater than the value.

Another related aspect of the embodiments defines a decoder comprising a number determining module for determining, after a current picture of a bitstream representing pictures of a video sequence has been decoded and stored in a DPB, a number of pictures in the DPB that are marked as needed for output. The decoder also comprises a comparing module for comparing the number against a value sps_max_num_reorder_pics[HighestTid]. The decoder further comprises an outputting module for outputting a picture, which is a first picture in output order, of the pictures in the DPB that are marked as needed for output if the number is greater than the value. The decoder additionally comprises a marking module for marking the picture as not needed for output if the number is greater than the value.

Another aspect of the embodiment relates to a method performed by an encoder. The method comprises determining, after a current picture has been decoded and stored in a DPB, a number of pictures in the DPB that are marked as needed for output. The method also comprises comparing the number against a value sps_max_num_reorder_pics[HighestTid]. The method further comprises marking a picture, which is a first picture in output order, of the pictures in the DPB that are marked as needed for output as not needed for output if the number is greater than the value.

A related aspect of the embodiments defines an encoder configured to determine, after a current picture has been decoded and stored in a DPB, a number of pictures in the DPB that are marked as needed for output. The encoder is also configured to compare the number against a value sps_max_num_reorder_pics[HighestTid]. The encoder is further configured to mark a picture, which is a first picture in output order, of the pictures in the DPB that are marked as needed for output as not needed for output if the number is greater than the value.

Another related aspect of the embodiments defines an encoder comprising a number determining module for determining, after a current picture has been decoded and stored in a DPB, a number of pictures in the DPB that are marked as needed for output. The encoder also comprises a comparing module for comparing the number against a value sps_max_num_reorder_pics[HighestTid]. The encoder further comprises a marking module for marking a picture, which is a first picture in output order, of the pictures in the DPB that are marked as needed for output as not needed for output if the number is greater than the value.

A further aspect of the embodiments relates to a method performed by a decoder. The method comprises parsing a slice header of a current picture to be decoded of a video sequence. The method also comprises determining a reference picture set (RPS) for the current picture based on the parsed slice header. The method further comprises marking all pictures in a DPB that are not present in the RPS as unused for reference. Zero, one or many pictures, marked as needed for output, of the pictures in the DPB are output and marked as not needed for output. The method also comprises emptying any picture, from the DPB, marked as unused for reference and not needed for output of the pictures in the DPB. The method further comprises decoding the current picture and determining a number of pictures in the DPB that are marked as needed for output. The number is compared against a value derived from at least one syntax element present in a bitstream representing pictures of the video sequence. If the number is greater than the value a picture, which is a first picture in output order, of the pictures in the DPB that are marked as needed for output is output and marked as not needed for output. In an embodiment, determining the number of pictures, comparing the number, outputting the picture and marking the picture are performed after decoding the current picture.

A related aspect of the embodiments defines a decoder configured to parse a slice header of a current picture to be decoded of a bitstream representing pictures of a video sequence and determine a RPS for the current picture based on the parsed slice header. The decoder is also configured to mark all pictures in a DPB that are not present in the RPS as unused for reference. The decoder is further configured to output zero, one or many pictures, marked as needed for output, of the pictures in the DPB and mark the zero, one or many pictures as not needed for output. The decoder is additionally configured to empty, from the DPB, any picture marked as unused for reference and not needed for output of the pictures in the DPB. In this embodiment, the decoder is also configured to decode the current picture. The decoder is further configured to determine a number of pictures in the DPB that are marked as needed for output. The decoder is additionally configured to compare the number against a value derived from at least one syntax element present in the bitstream. In this embodiment, the decoder is configured to output a picture, which is a first picture in output order, of the pictures in the DPB that are marked as needed for output and mark the picture as not needed for output if the number is greater than the value. The decoder is preferably configured to determine the number of pictures, compare the number, output the picture and mark the picture after decoding the current picture.

Another related aspect of the embodiments defines a decoder comprising a parsing module for parsing a slice header of a current picture to be decoded of a bitstream representing pictures of a video sequence. The decoder further comprises a reference picture set determining module for determining a RPS for the current picture based on the parsed slice header. The decoder also comprises a marking module for marking all pictures in a DPB that are not present in the RPS as unused for reference and an output module for outputting zero, one or many pictures, marked as needed for output, of the pictures in the DPB. The marking module is further for marking the zero, one or many pictures as not needed for output. The decoder comprises a picture emptying module for emptying, from the DPB, any picture marked as unused for reference and not needed for output of the pictures in the DPB. The decoder also comprises a decoding module for decoding the current picture. The decoder further comprises a number determining module for determining a number of pictures in the DPB that are marked as needed for output and a comparing module for comparing the number against a value derived from at least one syntax element present in the bitstream. In this embodiment, the outputting unit is further for outputting a picture, which is a first picture in output order, of the pictures in the DPB that are marked as needed for output if the number is greater than the value. The marking module is further for marking the picture as not needed for output if the number is greater than the value. In a preferred embodiment, the number determining module determining the number of pictures, the comparing module comparing the number, the outputting module outputting the picture and the marking module marking the picture after the decoding module decoding the current picture.

Yet another aspect of the embodiments relates to a method performed by an encoder. The method comprises marking all pictures in a DPB that are not present in a RPS for a current picture of a video sequence as unused for reference and marking zero, one or many pictures, marked as needed for output, of the pictures in the DPB is not needed for output. The method also comprises emptying, from the DPB, any picture marked as unused for reference and not needed for output of the pictures in the DPB. The method further comprises decoding the current picture. A number of pictures in the DPB that are marked as needed for output is determined and compared against a value derived from at least one defined syntax element. The method also comprises marking a picture, which is a first picture in output order, of the pictures in the DPB that are marked as needed for output as not needed for output if the number is greater than the value. In a preferred embodiment, determining the number of pictures, comparing the number and marking the picture are performed after decoding the current picture.

A related aspect of the embodiments defines an encoder configured to mark all pictures in a DPB that are not present in a RPS for a current picture of a video sequence as unused for reference. The encoder is also configured to mark zero, one or many pictures, marked as needed for output, of the pictures in the DPB, as not needed for output and empty, from the DPB, any picture marked as unused for reference and not needed for output of the pictures in the DPB. The encoder is further configured to decode the current picture. The encoder is additionally configured to determine a number of pictures in the DPB that are marked as needed for output and compare the number against a value derived from at least one defined syntax element. The encoder is also configured to mark a picture, which is a first picture in output order, of the pictures in the DPB that are marked as needed for output as not needed for output if the number is greater than the value. In a preferred embodiment, the encoder is configured to determine the number of pictures, compare the number and mark the picture after decoding the current picture.

Another related aspect of the embodiments defines an encoder comprising a marking module for marking all pictures in a DPB that are not present in a RPS for a current picture of a video sequence as unused for reference and marking zero, one or many pictures, marked as needed for output, of the pictures in the DPB, as not needed for output. The encoder also comprises a picture emptying module for emptying, from the DPB, any picture marked as unused for reference and not needed for output of the pictures in the DPB. The encoder further comprises a decoding module for decoding the current picture. The encoder also comprises a number determining module for determining a number of pictures in the DPB that are marked as needed for output and a comparing module for comparing the number against a value derived from at least one defined syntax element. In this embodiment, the marking module is further for marking a picture, which is a first picture in output order, of the pictures in the DPB that are marked as needed for output as not needed for output if the number is greater than the value. In a preferred embodiment, the number determining module determining the number of pictures, the comparing module comparing the number and the marking module marking the picture after the decoding module decoding the current picture.

Further aspects of the embodiments relates to a mobile terminal comprising a decoder according to above and/or an encoder according to above and a network node comprising a decoder according to above and/or an encoder according to above.

BRIEF DESCRIPTION OF THE DRAWINGS

The embodiments, together with further objects and advantages thereof, may best be understood by making reference to the following description taken together with the accompanying drawings, in which:

FIG. 1 is a schematic overview of a H.264/AVC decoder;

FIG. 2 illustrates output and decoding order for an example of a multi-layer video sequence;

FIG. 3 is a simplified decoding flow chart of H.264/AVC;

FIG. 4 illustrates output and decoding order for an example of a multi-layer video sequence;

FIG. 5 is a simplified decoding flow chart of HEVC;

FIG. 6 illustrates output and decoding order and temporal layers for an example of a multi-layer video sequence;

FIG. 7 illustrates output and decoding order for an example of a video sequence;

FIG. 8 is a flow chart of a method performed by a decoder according to an embodiment;

FIG. 9 is a flow chart of additional, optional steps of the method in FIG. 8;

FIG. 10 is a flow chart of an additional, optional step of the method in FIG. 8;

FIG. 12 is a flow chart of additional, optional steps of the method in FIG. 9 or 11;

FIG. 13 is a flow chart of an additional, optional step of the method in FIG. 8 or 11;

FIG. 14 is a simplified decoding flow chart of an embodiment;

FIG. 15 is a simplified decoding flow chart of another embodiment;

FIG. 20 is a schematic block diagram of a decoder according to a further embodiment;

FIG. 21 is a flow chart of a method performed by an encoder according to an embodiment;

FIG. 25 is a schematic block diagram of an encoder according to a further embodiment;

FIG. 29 is a schematic block diagram of a network node according to an embodiment; and FIG. 30 illustrates output and decoding order for an example of a multi-layer video sequence.

DETAILED DESCRIPTION

Figure 11:
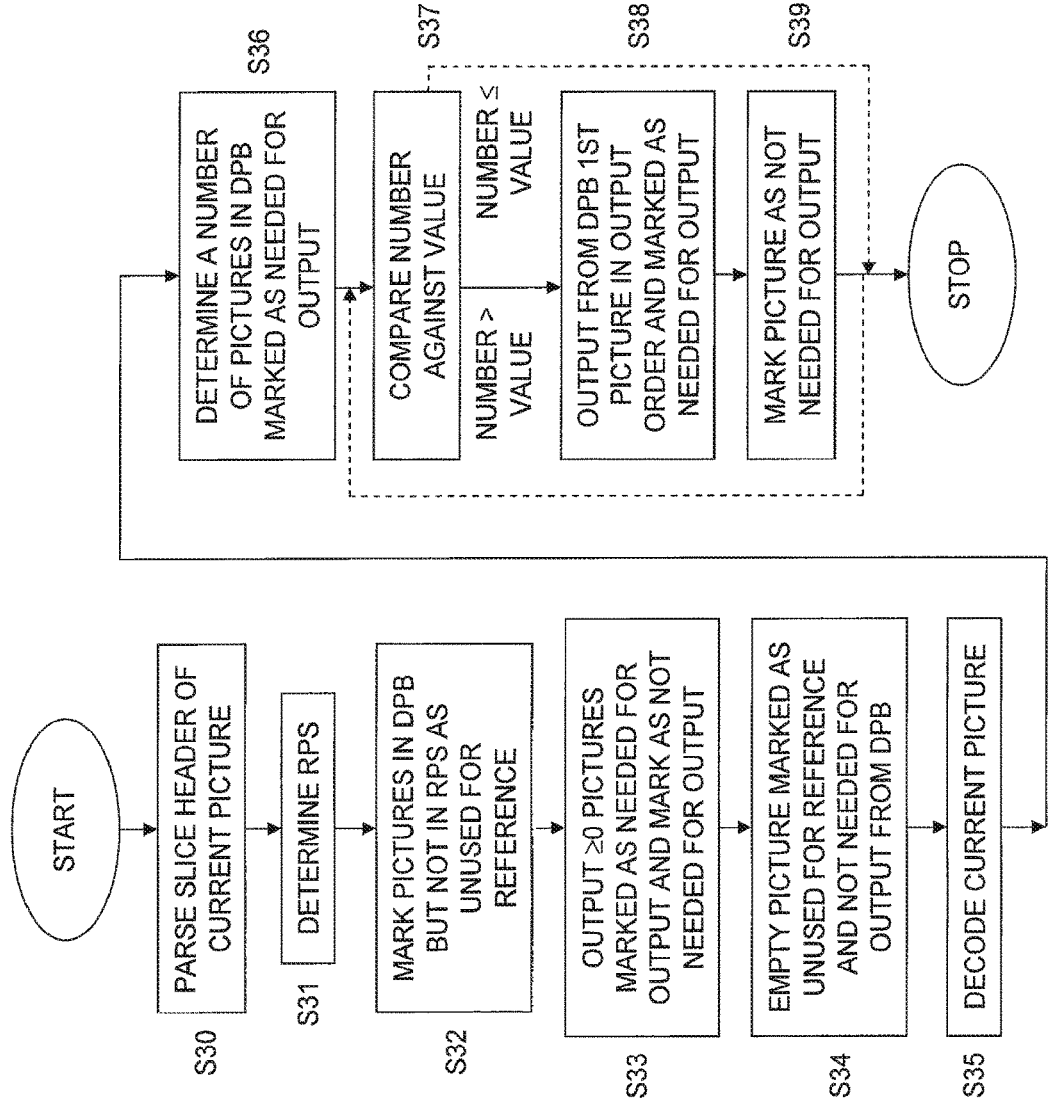
FIG. 11 is a flow chart of a method performed by a decoder according to another embodiment.

Throughout the drawings, the same reference numbers are used for similar or corresponding elements.

The present embodiments generally relate to decoding and encoding pictures of a video sequence, and in particular to outputting or bumping pictures from a decoded picture buffer in connection with decoding and encoding pictures. The embodiments thereby enable a reduction in the output delay and allow an earlier output of pictures than state of the art solutions.

In a general embodiment, when a picture is decoded, the decoder or encoder (picture decoding is also performed during encoding in order to obtain reconstructed reference pictures from previously encoded pictures) determines the number of pictures in a decoded picture buffer (DPB) that are marked as needed for output and compares that number against a value that is derived from syntax elements in the bitstream. If the number of pictures in the DPB marked as needed for output is greater than the value that is derived from syntax elements in the bitstream a modified output process is performed or the picture of the pictures in the DPB marked as needed for output, which is the first picture in output order is output, denoted picture output process #2, and marked as not needed for output.

Various particular implementation embodiments and aspects will now be described further herein starting with the decoding side and then continuing with the encoding side.

Marked as needed for output implies herein that a picture is waiting to be output, such as for display or storage. Correspondingly, marked as not needed for output implies herein that a pictures is not waiting to be output and may, for instance, already have been output. Correspondingly, marked as used for reference implies that a picture is used for prediction when another picture is decoded. Marked as unused for reference implies that the picture cannot be used for reference or prediction by subsequent pictures. The marking as mentioned above should not be interpreted as literally marking the pictures with a label "needed for output", "not needed for output", "used for reference" or "unused for reference". Rather, the marking should be interpreted that the picture is identified in some way that it should be/should not be output and that is could be used as reference picture/not used as reference picture. The marking could be implemented in various embodiments. For instance, the picture could be stored in a particular portion of the DPB dedicated for pictures that should be output or that should not be output or pictures that could be used as reference picture or that should not be used as reference picture. Alternatively, the picture could be tagged or otherwise associated with a flag or other codeword identifying the picture as needed for output vs. not needed for output and used for reference vs. unused for reference. In the case of a flag implementation, the flag could have a first value ($0_{bin}$ or $1_{bin}$) to indicate one of the alternatives and then have a second value ($1_{bin}$ or $0_{bin}$) to indicate the other alternative. For instance, a first flag could be used with regard to output of pictures and a second flag could be used with regard to reference.

Hence, a general aspect relates to a method performed by a decoder. In the method the decoder determines the number of pictures in the DPB that are marked as needed for output and compares that number against a value that is derived from syntax elements in the bitstream. If the number of pictures in the DPB marked as needed for output is greater than the value that is derived from syntax elements in the bitstream, a modified output process is performed or the picture of the pictures in the DPB marked as needed for output, which is the first picture in output order is output, denoted picture output process #2 herein, and marked as not needed for output.

This general aspect is preferably implemented in a HEVC compliant decoder, also referred to as a H.265 compliant decoder herein. In such a case, an implementation embodiment relates to a method performed by a HEVC compliant decoder and comprising the following steps. The HEVC compliant decoder determines a number of pictures in a DPB that are marked as needed for output. The HEVC compliant decoder also compares the number against a value derived from at least one syntax element present in a bitstream representing pictures of a video sequence. The HEVC compliant decoder further outputs a picture, which is a first picture in output order, of the pictures in the DPB that are marked as needed for output if the number is greater than the value. In addition, the HEVC compliant decoder marks the output picture as not needed for output if the number is greater than the value.

FIG. 8 is a flow chart of a method performed by a decoder according to an embodiment. The method comprises determining, in step S1 and after a current picture has been decoded and stored in a DPB, a number of pictures in the DPB that are marked as needed for output. A next step S2 comprises comparing this number against a value sps_max_num_reorder_pics[HighestTid]. If the number is greater than the value the method continues to step S3. This step S3 comprises outputting a picture, which is a first picture in output order, of the pictures in the DPB that are marked as needed for output. The picture, which was output in step S3, is then marked as not needed for output in step S4. Hence, this step S4 is performed if the number is greater than the value.

In this embodiment, sps_max_num_reorder_pics[HighestTid] is used as preferred representation of the value derived from at least one syntax element present in a bitstream representing pictures of a video sequence. Furthermore, HighestTid specifies a highest layer that is decoded by the decoder of the video sequence. Hence, HighestTid indicates the highest temporal sub-layer, if the video sequence comprises one or more temporal layers, and indicates the highest decoded layer, if the video sequence instead comprises another type of layers, such as one or more spatial layers, quality layers, etc.

In an embodiment, sps_max_num_reorder_pics[i] indicates the maximum allowed number of pictures that can precede any picture in the coded video sequence in decoding order and follow that picture in output order when HighestTid is equal to i. The prefix sps of max_num_reorder_pics[i] indicates that the syntax element is preferably present in a Sequence Parameter Set (SPS) of the bitstream.

Thus, in this embodiment there could be one value derived per layer in the bitstream and the value to use in the comparison performed in step S2 is the value that is derived for the highest layer that is actually decoded by the decoder of the video sequence. Please note that this highest decoded layer may be equal to or lower than the maximum number of layers in the video sequence as specified by a max_sub_layers_minus1 syntax element, such as vps_max_sub_layers_minus1 or sps_max_sub_layers_minus1, depending on whether the syntax element is retrieved from a Video Parameter Set (VPS) or SPS.

Hence, in a particular embodiment the video sequence is a multi-layer video sequence comprising multiple, i.e. at least two, layers of pictures. Each layer of the multiple layers then preferably has an associated syntax element defining a respective value. The value used in the comparison of step S2 is then the value obtained from the syntax element associated with, in this embodiment, the highest layer that is decoded by the decoder of the multiple layers.

In a particular embodiment, sps_max_num_reorder_pics[i] indicates the maximum allowed number of pictures in the same or lower layer, such as the same or lower temporal layer, as compared to the layer i, that precedes a picture in decoding order and follows that picture in output order.

In an embodiment, if the number is not greater than the value as determined in the comparison of step S2 the method preferably ends and no picture is output or marked. Thus, in such a case, steps S3 and S4 are omitted and not performed, see right hatched line.

In an embodiment, steps S2-S4 could be performed only once after a current picture has been decoded and stored in the DPB. Alternatively, the loop formed by steps S2-S4, see left hatched line, could be performed until the number of pictures in the DPB that are marked as needed for output is no longer larger than the value sps_max_num_reorder_pics[HighestTid]. Each time the loop of steps S2-S4 is performed the number of pictures in the DPB that are marked as needed for output is reduced by one through the marking, in step S4, of the picture output in step S3 as not needed for output. This means that steps S3 or S4 could be performed, after the current picture has been decoded and stored in the DPB, zero times, if number≤sps_max_num_reorder_pics[HighestTid]; once, if number=sps_max_num_reorder_pics[HighestTid]+1; or more than once if number>sps_max_num_reorder_pics[HighestTid]+1, i.e. n times if number=sps_max_num_reorder_pics[HighestTid]+n. Once the comparison in step S2 determines that the number is no longer larger than the value sps_max_num_reorder_pics[HighestTid] the method ends.

The determination of the number of pictures in the DPB marked as needed for output in step S1 is preferably performed after the current picture has been decoded and stored in the DPB.

The method as disclosed above and illustrated in FIG. 8 is preferably performed once for each picture of the video sequence that is decoded and stored in the DPB. Thus, the method is preferably instantaneously performed once the current pictures is considered as decoded, i.e. after the last decoding unit of the picture is decoded, and the current decoded picture is stored in an empty picture storage buffer, i.e. picture slot, in the DPB.

FIG. 9 is a flow chart of additional, optional steps of the method in FIG. 8. The method starts in step S10, which comprises parsing a slice header of the current picture to be decoded of the video sequence. A next step S11 determines a reference picture set (RPS) for the current picture based on the parsed slice header. All pictures in the DPB that are not present in the RPS are marked as unused for reference in step S12. A following step S13 comprises outputting zero, one or many, i.e. more than one, pictures, which are marked as needed for output, of the pictures in the DPB. This step S13 also comprises marking the output zero, one or many pictures as not needed for output. Step S14 comprises emptying or removing, from the DPB, any picture marked as unused for reference and not needed for output of the pictures in the DPB. The current picture is then decoded in step S15. The method then continues to step S1 in FIG. 8. Hence, in this embodiment determining the number of pictures in step S1, comparing the number in step S2, outputting the picture in step S3 and marking the picture in step S4 are performed after decoding the current picture in step S15.

In addition to decoding the current picture in step S15, this step preferably also comprises marking the current picture as used for reference, or in an optional embodiment marking the current picture as used for short-term reference. The current picture is preferably also marked as needed for output or not needed for output according to the value of the variable PicOutputFlag preferably obtained in step S10.

Generally, a coded video sequence, i.e. bitstream, comprises Network Abstraction Layer (NAL) units. Basically, one NAL unit comprises either a slice with a corresponding slice header including control information for that slice and video payload data or the NAL unit comprises a parameter set, such as VPS, SPS and Picture Parameter Set (PPS). The parameter set comprises control information. A picture of the video sequence may consist of a single slice or multiple slices. Step S10 of FIG. 9 thereby comprises parsing the slice header portion of the NAL unit comprising a slice of the picture. If the picture comprises multiple slices and is thereby distributed among multiple NAL units comprising a respective slice header then step S10 is preferably performed for each slice of the picture. However, steps S11 to S14 are preferably only performed for one of the slices in the picture, typically the first slice in the picture. The slice header parsed in step S10 comprises information enabling the decoder to generate an RPS. The RPS is a set of reference pictures associated with the current picture and consisting of all reference pictures that are prior to the current picture in decoding order and that may be used for reference, i.e. inter prediction, of the current picture or any picture in the video sequence following the current picture in decoding order.

The information obtained in step S10 and used to determine the RPS in step S11 may, for instance, comprise an identifier to a RPS syntax structure included in a parameter set, such as SPS, applicable to the current slice. An example of such an identifier applicable for HEVC is short_term_ref_pic_set_idx. The parameter set then comprises syntax elements defining one or more RPS, such as num_short_term_ref_pic_sets defining the number of short_term_ref_pic_set( ) syntax elements included in the SPS, where the short_term_ref_pic_set( ) syntax element defines a candidate RPS for the current picture.

Alternatively, the information obtained in step S10 could be used directly to determine the RPS in step S11. This information may, for instance, comprise short_term_ref_pic_set( ) syntax element, where the short_term_ref_pic_set( ) syntax element defines the RPS of the current picture.

More information of determining RPS can be found in WO 2013/002700 and sections 7.3.2.2, 7.3.5.1, 7.3.5.2, 7.4.2.2, 7.4.5.1, 7.4.5.2 and 8.3.2 in JCTVC-J1003_d7, High efficiency video coding (HEVC) text specification draft 8, B. Bross et al., JCT-VC of ITU-T SG16 WP3 and ISO/IEC JTC1/SC29/WG11 10$^{th}$ Meeting, Stockholm, 11-20 Jul. 2012.

The RPS specifies, as mentioned in the foregoing, the pictures of the video sequence that are to be kept in the DPB, i.e. be available for use as reference pictures when decoding the current picture and/or when decoding pictures following the current picture in decoding order. This means that any reference pictures stored in the DPB but not listed in the RPS will not be used as reference picture anymore. Hence, step S12 thereby comprises marking such pictures in the DPB but not identified in the RPS as unused for reference.

The output of pictures in step S13 can comprise outputting one picture marked as needed for output, outputting more than one picture marked as needed for output or indeed not outputting any picture at all. Any pictures output in step S13 are output according to an output order, preferably output in the order of smallest value of Picture Order Count (POC).

Any picture output in step S13 is then marked as not needed for output since the picture has then been output. If zero pictures are output no marking is of course performed in this step S13.

Pictures that are marked as unused for reference and not needed for output are no longer need, neither as reference pictures nor for output. Accordingly, step S14 empties or removes any such marked pictures from the DPB to thereby free a picture storage buffer, i.e. picture slot, in the DPB.

Decoding of the current picture is performed according to well-known methods of picture decoding, such as specified in the HEVC/H.265 standard. Hence, the decoding in step S35 involves generating pixels values of the pixels or samples in the current picture, typically using pixel values of one or more previously decoded pictures stored in the DPB as reference pictures.

In the embodiment as shown in FIG. 9, the method as shown in FIG. 8 and comprising steps S1-S4 could be regarded as an additional or further picture output process, which has been mentioned in the foregoing as picture output process #2. This embodiment thereby enables output of pictures in step S3 even after the current picture has been decoded in step S15 but prior to starting processing a next picture in the bitstream, i.e. prior to performing step S10 for a next picture in decoding order.

FIG. 14 summarizes this embodiment. Hence, in one embodiment an additional picture output process step is added after picture decoding in order to allow earlier output of pictures, see FIG. 14. A decoder method may contain and/or a decoder may be configured to perform the following ordered steps according to the embodiment:

1. The slice header, including the RPS, of the first slice header of a picture P is parsed.
2. A picture marking process is done, e.g. pictures may be marked unused for reference by the RPS from the slice header.
3. A picture output process is done in which pictures may be output.
4. Picture P is decoded.
5. After picture P is decoded, the decoder determines the number of pictures in the DPB that are marked as needed for output and compares that number against a value that is derived from syntax elements, exemplified by sps_max_num_reorder_pics[HighestTid], in the bitstream.
6. If the number of pictures in the DPB marked as needed for output is greater than the value that is derived from syntax elements in the bitstream, the picture of the pictures in the DPB marked as needed for output which is the first picture in output order is output and marked as not needed for output. Thus, according to the embodiment the picture output process #2 is introduced.
7. The next picture Q is decoded by repeating steps 1-6 above for picture Q.

The method as disclosed in FIG. 8 could also be implemented as part of a modified output process, such as for HEVC. In this approach, the existing picture output process step is modified in order to allow earlier output of pictures.

The modification provides a solution to the problem with no_output_of_prior_pics_flag as discussed in the background section. The solution is similar to the embodiments discussed above but with the change that instead of adding an additional output process, the existing HEVC output process is modified when no_output_of_prior_pics_flag is equal to 1.

FIG. 10 is a flow chart of an additional, optional step of the method in FIG. 8 when implementing the above-mentioned embodiment. Step S20 comprises parsing a slice header of a random access picture (RAP), also referred to as intra random access point (IRAP) picture in the art, of the video sequence to obtain a value of a no_output_of_prior_pics_flag flag. If the value of the no_output_of_prior_pics_flag flag is 1 the method continues to step S1 of FIG. 8. Hence, in this embodiment, determining the number in step S1, comparing the number in step S2, outputting the picture in step S3 and marking the picture in step S4 are performed if the value of the no_output_of_prior_pics_flag is one.

Correspondingly, if the value of the no_output_of_prior_pics_flag value is zero (0) the method ends and the modified output process is not performed.

When this embodiment is applied to HEVC the method preferably comprises the additional steps of determining a RPS for the random access picture based on the slice header parsed in step S20 (compare with step S11 in FIG. 9). The method also comprises marking all pictures in the DPB that are not listed in the RPS as unused for reference (compare with step S12 in FIG. 9). The random access picture is decoded (compare with step S15 in FIG. 9). In this embodiment, determining the number in step S1, comparing the number in step S2, outputting the picture in step S3 and marking the picture in step S4 are performed after marking the pictures not listed in the RPS but prior to decoding the random access picture.

FIG. 15 is a simplified decoding flow chart of this embodiment. A decoder method may contain and/or a decoder may be configured to perform the following ordered steps according to the embodiment:

1) The slice header of the first slice header of a picture P is parsed.
2) A picture marking process is done.
3) A picture output process is done in which pictures may be output. The picture output process is modified such that if no_output_of_prior_pics_flag is equal to 1, the following applies:
   a. The decoder determines the number of pictures in the DPB that are marked as needed for output and compares that number against a value that is derived from syntax elements in the bitstream.
   b. If the number of pictures in the DPB marked as needed for output is greater than the value that is derived from syntax elements in the bitstream, the picture of the pictures in the DPB marked as needed for output which is first in output order is output and marked as not needed for output.
   c. All remaining pictures in the DPB that are marked as needed for output are marked as not needed for output. They are not output.
4) Picture P is decoded.

FIG. 11 is a flow chart of a method performed by a decoder according to another embodiment. The method comprises parsing a slice header of a current picture to be decoded of a video sequence in step S30. A RPS is determined for the current picture based on the parsed slice header in step S31. The following step S32 comprises marking all pictures in the DPB that are not present in the RPS as unused for reference. Zero, one or many pictures marked as needed for output of the pictures in the DPB are output and marked as not needed for output in step S33. The following step S34 comprises emptying or removing any picture, from the DPB, which is marked as unused for reference and not needed for output of the pictures in the DPB. The current picture is then decoded in step S35.

These steps S30 to S35 basically correspond to steps S10-S15 discussed in the foregoing and illustrated in FIG. 9.

The method then continues to step S36, which comprises determining a number of pictures in the DPB that are marked as needed for output. This number is compared in step S37 against a value derived from at least one syntax element present in a bitstream representing pictures of the video sequence. If the number is greater than the value the method continues to steps S38 and S39. Step S38 comprises outputting a picture, which is the first picture in output order, of the pictures in the DPB that are marked as needed for output. Step S39 comprises marking the picture, output in step S38, as not needed for output.

In this embodiment, determining the number of pictures in step S37, comparing the number in step S38, outputting the picture in step S38 and marking the picture in step S39 are performed after decoding the current picture in step S35.

Steps S36 to S39 correspond to steps S1 to S4 discussed in the foregoing and shown in FIG. 8 but with a difference in that the value against which the determined number is compared in step S37 does not necessarily have to be sps_max_num_reorder_pics[HighestTid] but could instead be a value derived from (an)other syntax element(s) present in the bitstream, which is further discussed below.

In an embodiment, if the number is not greater than the value as determined in the comparison of step S37 the method preferably ends and no picture is output or marked. Thus, in such a case, steps S38 and S39 are omitted and not performed, see right hatched line.

In an embodiment, steps S37-S39 could be performed only once after a current picture has been decoded and preferably stored in the DPB. Alternatively, the loop formed by steps S37-S39, see left hatched line, could be performed until the number of pictures in the DPB that are marked as needed for output is no longer larger than the value. Each time the loop of steps S37-S39 is performed the number of pictures in the DPB that are marked as needed for output is reduced by one through the marking, in step S39, of the picture, output in step S38, as not needed for output.

FIG. 12 is a flow chart of additional, optional steps of the method in FIG. 11 but also applicable to the embodiments as shown in FIGS. 8 and 9. The method continues from step S35 in FIG. 11 or step S15 in FIG. 9, in which the current picture was decoded. A next step S40 comprises storing the decoded current picture in the DPB in an empty picture storage buffer, i.e. picture slot. The decoded current picture is marked in step S41 as needed for output or as not needed for output. The picture is optionally also marked as used for short-term reference, i.e. used as reference picture. This step S41 is preferably performed based on a PicOutputFlag assigned to the current picture. Thus, if the flag has a value of 1 then the decoded current picture is marked as needed for output and otherwise, i.e. the flag has a value of 0, the decoded current picture is marked as not needed for output. The PicOutputFlag may be derived from syntax element in the bitstream applicable to the present current picture, such as based on the syntax element pic_output_flag that may be present in the slice header of the current picture.

The method then continues to step S36 of FIG. 11 or step S1 of FIG. 8, where the number of pictures in the DPB marked as needed for output is determined.

Herein various embodiments of selecting the value used in the comparison in step S37 of FIG. 11 and in step S2 of FIG. 8 will be described.

In an embodiment, the video sequence is a multi-layer video sequence comprising multiple layers of pictures. Each layer of the multiple layers then has an associated syntax element defining a respective value used in the output process. The method further comprises an additional, optional step as shown in the flow chart of FIG. 13. The method continues from step S35 in FIG. 11 or from step S1 in FIG. 8. A next step S50 comprises selecting a value derived from a syntax element associated with a highest layer that is decoded by the decoder of the multiple layers. The method then continues to step S37 in FIG. 11 or step S2 in FIG. 8 where this selected value is used.

Step S37 and step S2 preferably comprise, in this embodiment, comparing the number determined in step S36 or S1 against a value of sps_max_num_reorder_pics[HighestTid]. If the number is larger than the value sps_max_num_reorder_pics[HighestTid] the method continues to step S38 or S3, which comprise, in this embodiment, outputting a picture in the DPB with a smallest value of PicOrderCntVal of all pictures in the DPB that are marked as needed for output. PicOrderCntVal represents a picture order count value of the picture, which in turn preferably defines the output order of pictures stored in the DPB.

In a particular implementation aspect of this embodiment, the video sequence is a multi-layer video sequence comprising multiple layers of pictures. In such a case, each layer has a respective value, i.e. sps_max_num_reorder_pics[i] for layer number i. The value to use is then the value associated with the highest decoded layer, i.e. the highest layer that is decoded by the decoder, such as the highest sub-layer if the layers are different temporal layers.

In another embodiment, the video sequence is a multi-layer video sequence comprising multiple layers of pictures. Each layer of the multiple layers then has an associated syntax element defining a respective value. The method further comprises an additional, optional step as shown in the flow chart of FIG. 13. The method continues from step S36 in FIG. 11. A next step S50 comprises selecting a value derived from a syntax element associated with a highest layer of the multiple layers. The method then continues to step S37 where this selected value is used.

Step S37 preferably comprises, in this embodiment, comparing the number determined in step S36 against a value of sps_max_num_reorder_pics[sps_max_sub_layers_minus1]. If the number is larger than the value sps_max_num_reorder_pics[sps_max_sub_layers_minus1] the method continues to step S38, which comprise, in this embodiment, outputting a picture in the DPB with a smallest value of PicOrderCntVal of all pictures in the DPB that are marked as needed for output. The syntax element sps_max_sub_layers_minus1 specifies a maximum number of layers of the video sequence.

In a particular implementation aspect of this embodiment, the video sequence is a multi-layer video sequence comprising multiple layers of pictures. In such a case, each layer has a respective value, i.e. sps_max_num_reorder_pics[i] for layer number i. The value to use is then the value associated with the highest layer in the bitstream.

In a further embodiment, the video sequence is a multi-layer video sequence comprising multiple layers of pictures. Each layer of the multiple layers then has an associated syntax element defining a respective value. The method further comprises an additional, optional step as shown in the flow chart of FIG. 13. The method continues from step S36 in FIG. 11. A next step S50 comprises selecting a value derived from a syntax element associated with a layer of the multiple layers to which the decoded current picture belongs. The method then continues to step S37 where this selected value is used.

In yet another embodiment, the video sequence is a multi-layer video sequence comprising multiple layers of pictures. Each layer of the multiple layers then has an associated syntax element defining a respective value. The method further comprises an additional, optional step as shown in the flow chart of FIG. 13. The method continues from step S36 in FIG. 11. A next step S50 comprises selecting a maximum value of the respective values.

The method as shown in FIG. 11 can be applied to a current picture that is a random access picture of the video sequence. In such a case, step S30 preferably comprises parsing the slice header of the random access picture to obtain a value of a no_output_prior_flag flag. In such a case, determining the number in step S36, comparing the number in step S37, outputting the picture in step S38 and marking the picture in step S39 could be conditional based on the value of this flag. Hence, in an optional embodiment these steps S36-S39 are performed if the value of the no_output_prior_flag flag is 1.

In an embodiment, marking the picture as performed in step S12 of FIG. 9 and S32 of FIG. 11 preferably comprises marking all pictures in the DPB that are not present in the RPS as unused for reference. These steps optionally also comprise marking all pictures in the DPB that are present in the RPS as used for reference. However, generally a picture is marked as used for reference once it is decoded and stored in the DPB. Hence, step S12 and S32 typically involve remarking pictures that no longer are needed for reference.

In an embodiment, outputting the picture as performed in step S3 of FIG. 8 and step S38 of FIG. 11 preferably comprises outputting a picture with smallest picture order count value of the pictures in the DPB that are marked as needed for output if the number is greater than the value as determined in step S2 or S37. The picture order count value is preferably represented by the parameter PicOrderCntVal.

In an embodiment, outputting the picture as performed in step S3 of FIG. 8 and step S38 of FIG. 11 is preferably performed before parsing a slice header of a next picture to be decoded of the coded video sequence.

In an embodiment, the method as performed in FIG. 8 or in FIG. 11 comprises the additional step of retrieving the at least one syntax element from a parameter set associated with the bitstream and selected from a group consisting of a PPS, a SPS and a VPS. A PPS is identified based on a PPS identifier present in the slice header of the current picture. A SPS that applies to the current picture is identified by a SPS identifier present in the PPS identified by the PPS identifier present in the slice header of the current picture. Correspondingly, a VPS that applies to the current picture is identified by a VPS identifier present in the SPS that applies to the current picture. In a particular embodiment, the at least one syntax element is retrieved from a SPS.

A particular embodiment, which is applicable to an implementation using no_output_prior_pics_flag, comprises an additional step of preferably marking all remaining pictures in the DPB marked as needed for output as not needed for output if the no_output_prior_pics_flag flag is one.

In a related embodiment, the method comprises the further step of emptying all pictures in the DPB without output of any pictures if the no_output_prior_pics_flag flag is one. The fullness of the DPB is then set equal to zero to indicate the DPB is empty.

Here below various example embodiments will be further discussed.

Example Embodiment 1

In one embodiment, an additional picture output process step is added after picture decoding in order to allow earlier output of pictures, see FIG. 14.

A decoder method may contain and/or a decoder may be configured to perform the following ordered steps according to the embodiment:
1. The slice header of the first slice header of picture P is parsed.
2. A picture marking process is done.
3. A picture output process is done in which pictures may be output.
4. Picture P is decoded.
5. After picture P is decoded, the decoder determines the number of pictures in the DPB that are marked "needed for output" and compares that number against a value that is derived from syntax elements (exemplified by embodiment 9) in the bitstream.
6. If the number of pictures in the DPB marked "needed for output" is greater than the value that is derived from syntax elements in the bitstream, the picture of the pictures in the DPB marked "needed for output" which is the first picture in output order is output and marked "not needed for output". Thus, according to the embodiment the picture output process #2 is introduced.
7. A next picture Q is decoded

Example Embodiment 2

The same as example embodiment 1 where the value is represented by a single codeword of the syntax element in the bitstream.

Example Embodiment 3

The same as example embodiment 2 where the value is represented by a codeword in a sequence parameter set, e.g. a picture parameter set (PPS), a sequence parameter set (SPS) or a video parameter set (VPS).

Example Embodiment 4

The same as embodiment 1-3 where there is one layer dependent value derived per layer in the bitstream and the value to use in the comparison is the value that is derived for the same layer as picture P.

Example Embodiment 5

The same as embodiment 1-3 where there is one value derived per layer in the bitstream and the value to use in the comparison is the value that is derived for the highest layer in the bitstream.

Example Embodiment 6

The same as embodiment 1-3 where there is one value derived per layer in the bitstream and the value to use in the comparison is the maximum value for all layers.

Example Embodiment 7

The same as embodiment 5 where the highest layer is defined as the highest sub-layer.

Example Embodiment 8

The same as embodiment 1-7 where first picture in output order is defined as the picture in the DPB with the smallest value of PicOrderCntVal. PicOrderCntVal defines the POC and is described above.

Example Embodiment 9

The same as embodiment 4-8 where the layers are temporal layers.

Example Embodiment 10

The combination of embodiments 1, 2, 3, 5, 8 and 9 is one preferred embodiment. Expressing this embodiment in the current HEVC specification (JCTVC-K0030_v3) could result in the following HEVC specification changes in section C.5.3 where bold text means added text:

C.5.3 Picture Decoding, Marking and Storage and Possible Output of One Picture

The following happens instantaneously when the last decoding unit of access unit n containing the current picture is removed from the CPB.

The current picture is considered as decoded after the last decoding unit of the picture is decoded. The current decoded picture is stored in an empty picture storage buffer in the DPB, and the following applies.

1. —If the current decoded picture has PicOutputFlag equal to 1, it is marked "needed for output".

2. —Otherwise (the current decoded picture has PicOutputFlag equal to 0), it is marked "not needed for output".

If the current decoded picture is a reference picture, it is marked "used for reference", otherwise (the current decoded picture is a non-reference picture), it is marked "unused for reference".

When the Number of Pictures in the DPB that are Marked "Needed for Output" is Greater than Sps_Max_Num_Reorder_Pics[Sps_Max_Sub_Layers_Minus1] after the Current Decoded Picture has been Stored in the DPB, the Picture in the DPB with the Smallest Value of PicOrderCntVal of all Pictures in the DPB is Cropped, Output and Marked "not Needed for Output".

Example Embodiment 11

The combination of embodiments 1, 2, 3, 7, 8 and 9 is another preferred embodiment. Expressing this embodiment in the current HEVC specification (JCTVC-K0030_v3) could result in the following HEVC specification changes in section C.5.3 where bold text means added text:

C.5.3 Picture Decoding, Marking and Storage and Possible Output of One Picture

The following happens instantaneously when the last decoding unit of access unit n containing the current picture is removed from the CPB.

The current picture is considered as decoded after the last decoding unit of the picture is decoded. The current decoded picture is stored in an empty picture storage buffer in the DPB, and the following applies.

1. —If the current decoded picture has PicOutputFlag equal to 1, it is marked "needed for output".

2. —Otherwise (the current decoded picture has PicOutputFlag equal to 0), it is marked "not needed for output".

If the current decoded picture is a reference picture, it is marked "used for reference", otherwise (the current decoded picture is a non-reference picture), it is marked "unused for reference".

When the Number of Pictures in the DPB that are Marked "Needed for Output" is Greater than Sps_Max_Num_Reorder_Pics[HighestTid] after the Current Decoded Picture has been Stored in the DPB, the Picture in the DPB with the Smallest Value of PicOrderCntVal of all Pictures in the DPB is Cropped, Output and Marked "not Needed for Output".

Example Embodiment 12

In one embodiment, the existing picture output process step is modified in order to allow earlier output of pictures, see FIG. 15.

The modification provides a solution to the problem with no_output_of_prior_pics_flag as described above. The solution is similar to example embodiments 1-11 but with the change that instead of adding an additional output process, the existing HEVC output process is modified when no_output_of_prior_pics_flag is equal to 1 as shown below.

A decoder method may contain and/or a decoder may be configured to perform the following ordered steps according to the embodiment:
1. The slice header of the first slice header of picture P is parsed.
2. A picture marking process is done.
3. A picture output process is done in which pictures may be output. The picture output process is modified such that if no_output_of_prior_pics_flag is equal to 1, the following applies:
   a. The decoder determines the number of pictures in the DPB that are marked "needed for output" and compares that number against a value that is derived from syntax elements in the bitstream.
   b. If the number of pictures in the DPB marked "needed for output" is greater than the value that is derived from syntax elements in the bitstream, the picture of the pictures in the DPB marked "needed for output" which is first in output order is output and marked "not needed for output".
   c. All remaining pictures in the DPB that are marked "needed for output" are marked "not needed for output". They are not output.
4. Picture P is decoded.

The example embodiments 2-12 apply also to this example embodiment 12.

Example Embodiment 13

The combination of example embodiment 12 and example embodiments 2, 3, 7, 8 and 9 is a preferred embodiment. Expressing this embodiment in the current HEVC specification (JCTVC-K0030_v3) could result in the following HEVC specification changes in section C.3.1 where bold text means added text:

C.3.1 Removal of Pictures from the DPB

The removal of pictures from the DPB before decoding of the current picture (but after parsing the slice header of the first slice of the current picture) happens instantaneously at the CPB removal time of the first decoding unit of access unit n (containing the current picture) and proceeds as follows.

The decoding process for reference picture set as specified in subclause 8.3.2 is invoked. If the current picture is an IDR or a BLA picture, the following applies:

1. When the IDR or BLA picture is not the first picture decoded and the value of pic_width_in_luma_samples or pic_height_in_luma_samples or sps_max_dec_pic_buffering[i] for any possible value of i derived from the active sequence parameter set is different from the value of pic_width_in_luma_samples or pic_height_in_luma_samples or sps_max_dec_pic_buffering[i] derived from the sequence parameter set that was active for the preceding picture, respectively, no_output_of_prior_pics_flag is inferred to be equal to 1 by the HRD, regardless of the actual value of no_output_of_prior_pics_flag.

NOTE—Decoder implementations should try to handle picture or DPB size changes more gracefully than the HRD in regard to changes in pic_width_in_luma_samples, pic_height_in_luma_samples, or sps_max_dec_pic_buffering[i].

2. When no_output_of_prior_pics_flag is equal to 1 or is inferred to be equal to 1, the following ordered steps apply:
   1. When the number of pictures in the DPB that are marked "needed for output" is greater than sps_max_num_reorder_pics[HighestTid], the picture in the DPB with the smallest value of PicOrderCntVal of all pictures in the DPB is cropped, output and marked "not needed for output".
   2. All picture storage buffers in the DPB are emptied without output of the pictures they contain, and DPB fullness is set to 0.

All pictures kin the DPB, for which all of the following conditions are true, are removed from the DPB:

picture k is marked "unused for reference", picture k has PicOutputFlag equal to 0 or its DPB output time is less than or equal to the CPB removal time of the first decoding unit (denoted as decoding unit m) of the current picture n; i.e. $t_{o,dpb}(k) <= t_r(m)$ When a picture is removed from the DPB, the DPB fullness is decremented by one.

An advantage of embodiments as disclosed herein over the prior art as represented by section C.5.1 on pages 216-217 in JCTVC-K0030_v3 will be described below with reference to FIG. 30. The prior art solution in JCTVC-K0030_v3 uses the parameter sps_max_num_reorder_pics[TemporalID] to determine whether to output any picture. In particular, JCTVC-K0030_v3 states that when the number of pictures in the DPB that are marked as needed for output is greater than sps_max_num_reorder_pics[TemporalID] then the bumping process specified in subclause C.5.2.1 is invoked repeatedly until there is an empty picture storage buffer to store the current decoded picture.

The numbers presented in FIG. 30 indicate the decoding order of the pictures in the video sequence. The pictures should be output from left to right, i.e. I0, b5, B3, b6, B2, b7, B4, B8 and P1. The figure also indicates the layer number, i.e. TemporalId, for the different layers and the parameter sps_max_num_reorder_pics for each layer. If one would bump or output pictures in connection with parsing of slice headers using sps_max_num_reorder_pics[TemporalID] as suggested in JCTVC-K0030_v3 then the output process will be according to below:

| Picture | Not output yet | sps_max_num_reorder_pics | Action |
|---------|----------------|--------------------------|-----------|
| I0 | — | 0 | No action |
| B1 | I0 | 0 | Output I0 |
| B2 | B1 | 1 | No action |
| B3 | B1 B2 | 2 | No action |
| B4 | B1 B2 B3 | 2 | Output B3 |

However, outputting picture B3 when processing picture B4 is incorrect since picture b5 should be output prior to picture B3.

If using an embodiment as disclosed herein with bumping, i.e. outputting, after decoding of the current picture and using HighesTId=3 then the following result is achieved.

| Picture | Not output yet | sps_max_num_reorder_pics | Action |
|---------|----------------|--------------------------|-----------|
| I0 | I0 | 4 | No action |
| B1 | I0 B2 | 4 | No action |
| B2 | I0 B1 B2 | 4 | No action |
| B3 | I0 B1 B2 B3 | 4 | No action |
| B4 | I0 B1 B2 B3 B4 | 4 | Output I0 |
| B5 | B1 B2 B3 B4 b5 | 4 | Output b5 |

If one uses temporal scaling and only decodes layers 0-2 then HighesTid is 2 and the following result is achieved according to an embodiment:

| Picture | Not output yet | sps_max_num_reorder_pics | Action |
|---------|----------------|--------------------------|-----------|
| I0 | I0 | 2 | No action |
| B1 | I0 B1 | 2 | No action |
| B2 | I0 B1 B2 | 2 | Output I0 |
| B3 | B1 B2 B3 | 2 | Output B3 |
| B4 | B1 B2 B4 | 2 | Output B2 |

Hence, embodiments as disclosed herein are able to output pictures in correct order in the example as illustrated in FIG. 30, whereas the prior art solution in JCTVC-K0030_v3 does not give the correct output order when invoking the pumping process after parsing of slice headers.

The steps, functions, procedures, modules and/or blocks described above in connection with FIGS. 8-15 may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above in connection with FIGS. 8-15 may be implemented in software such as a computer program for execution by suitable processing circuitry including one or more processors.

The processor is capable of executing software instructions contained in a computer program stored in a computer program product e.g. in the form of the memories. The respective computer program product can be a memory being any combination of Random Access Memory (RAM) and Read-Only Memory (ROM). The respective memory comprises persistent storage, which, for example, can be any single one or combination of magnetic memory, optical memory, solid state memory or even remotely mounted memory.

The flow diagram or diagrams presented above and shown in FIGS. 8-15 may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, a decoder configured to perform a method according to any of the embodiments disclosed above is provided. The decoder is configured to determine, after a current picture of a bitstream representing pictures of a video sequence has been decoded and stored in a DPB, a number of pictures in the DPB that are marked as needed for output. The decoder is also configured to compare the number against a value sps_max_num_reorder_pics[HighestTid]. The decoder is further configured to output a picture, which is a first picture in output order, of the pictures in the DPB that are marked as needed for output if the number is greater than the value. The decoder is additionally configured to mark the (output) picture as not needed for output if the number is greater than the value.

The decoder 100 comprises, in an embodiment, a processor 110 configured to perform the method steps previously disclosed herein, see FIG. 8 and optionally FIGS. 9, 10 and 12-14. The decoder 100 may also comprise a memory 120 connected to the processor 110, see FIG. 16.

Figure 16:
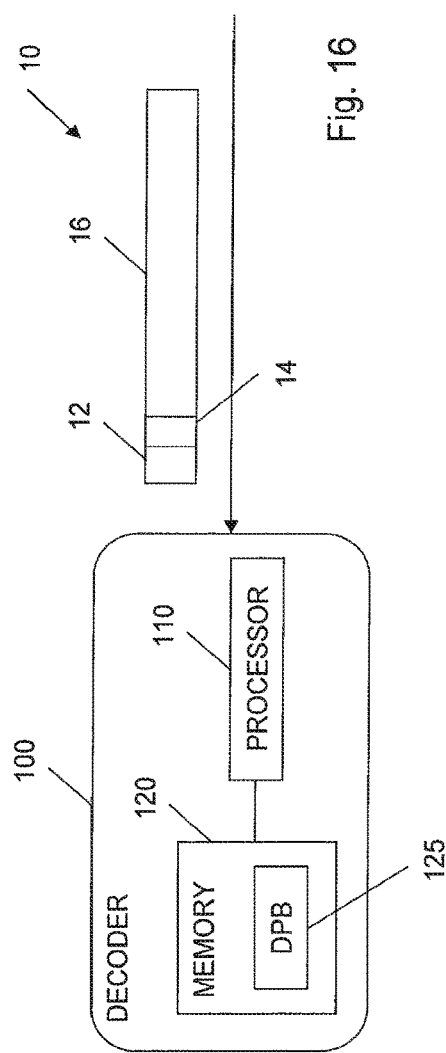
FIG. 16 is a schematic block diagram of a decoder according to an embodiment.

FIG. 16 is a schematic block diagram of a decoder 100 according to an embodiment. The decoder 100 is configured to receive a bitstream 10 representing pictures of a video sequence and decode the bitstream 10. The decoder 100 comprises a processor 110 and a memory 120 comprising a DPB 125. The processor 110 is configured to determine, after the current picture has been decoded and stored in the DPB 125, the number of pictures in the DPB 125 that are marked as needed for output. The processor 110 is also configured to compare the number against the value sps_max_num_reorder_pics[HighestTid] 14. The processor 110 is further configured to output the picture, which is a first picture in output order, of the pictures in the DPB 125 that are marked as needed for output if the number is greater than the value. The processor 110 is additionally configured to mark the picture as not needed for output if the number is greater than the value.

In FIG. 16, the decoder 100 has been illustrated as comprising a processor 110. This processor 110 could be implemented as a single processor or multiple processors, such as in the form of a processing circuitry.

FIG. 16 thereby illustrates a computer implementation of the decoder 100. In this particular example, at least some of the steps, functions, procedures, modules and/or blocks described above are implemented in a computer program, which is loaded into the memory 120 for execution by the processor 110. The processor 110 and memory 120 are interconnected to each other to enable normal software execution. An optional input/output device (not shown) may also be interconnected to the processor 110 and/or the memory 120 to enable input of a bitstream 10 of coded pictures and output of decoded pictures.

The term 'computer' should be interpreted in a general sense as any system, device or apparatus capable of executing program code or computer program instructions to perform a particular processing, determining or computing task.

In an embodiment, the processor 110 is preferably configured to parse a slice header 12 of the current picture to be decoded of the video sequence. The processor 110 is also configured to determine a RPS for the current picture based on the parsed slice header 12. The processor 110 is further configured to mark all pictures in the DPB 125 that are not present in the RPS as unused for reference. The processor 110 is additionally configured to output zero, one or many pictures, marked as needed for output, of the pictures in the DPB 125 and mark the zero, one or many pictures as not needed for output. The processor 110 is preferably also configured to empty or remove, from the DPB 125, any picture marked as unused for reference and not needed for output of the pictures in the DPB 125. The processor 110 is further configured to decode the current picture, preferably using video payload data 16 provided in coded form. In this embodiment, the processor 110 is configured to determine the number of pictures, compare the number, output the picture and mark the picture after decoding the current picture.

In an embodiment, the processor 110 is optionally configured to parse a slice header 12 of a random access picture of the video sequence to obtain a value of no_output_prior_pics_flag flag. In such a case, the processor 110 is optionally configured to determine the number, compare the number, output the picture and mark the picture if (and only if) the value of no_output_prior_pics_flag flag is one.

Another aspect of the embodiments relates to a decoder configured to parse a slice header of a current picture to be decoded of a video sequence. The decoder is also configured to determine a RPS for the current picture based on the parsed slice header. The decoder is further configured to mark all pictures in the DPB that are not present in the RPS as unused for reference. The decoder is additionally configured to output zero, one or many pictures, marked as needed for output, of the pictures in the DPB and mark the zero, one or many pictures as not needed for output. The decoder is preferably also configured to empty or remove, from the DPB, any picture marked as unused for reference and not needed for output of the pictures in the DPB. The decoder is further configured to decode the current picture. In this embodiment, the decoder is configured to determine a number of pictures in the DPB that are marked as needed for output. The decoder is also configured to compare the number against a value derived from at least one syntax element present in the bitstream. The decoder is further configured to output a picture, which is a first picture in output order, of the pictures in the DPB that are marked as needed for output if the number is greater than the value. The decoder is additionally configured to mark the picture as not needed for output if the number is greater than the value. This means that in this embodiment, the decoder is configure determine the number of pictures, compare the number, output the picture and mark the picture after decoding the current picture.

The encoder 100 comprises, in an embodiment, a processor 110 configured to perform the method steps previously disclosed herein, see FIG. 11 and optionally FIGS. 12, 13 and 15. The encoder 100 may also comprise a memory 120 connected to the processor 110, see FIG. 16.

In this embodiment, the decoder 100 therefore comprises a processor 110 and a memory 120 comprising a DPB 125. The processor 110 is configured to parse the slice header 12 of the current picture to be decoded of the video sequence. The processor 110 is also configured to determine the RPS for the current picture based on the parsed slice header 12. The processor 110 is further configured to mark all pictures in the DPB 125 that are not present in the RPS as unused for reference. The processor 110 is additionally configured to output zero, one or many pictures, marked as needed for output, of the pictures in the DPB 125 and mark the zero, one or many pictures as not needed for output. The processor 110 is preferably also configured to empty or remove, from the DPB 125, any picture marked as unused for reference and not needed for output of the pictures in the DPB 125. The processor 110 is further configured to decode the current picture. In this embodiment, the processor 110 is configured to determine the number of pictures in the DPB 125 that are marked as needed for output. The processor 110 is also configured to compare the number against the value derived from at least one syntax element 14 present in the bitstream 10. The processor 110 is further configured to output the picture, which is a first picture in output order, of the pictures in the DPB 125 that are marked as needed for output if the number is greater than the value. The processor 110 is additionally configured to mark the picture as not needed for output if the number is greater than the value. This means that in this embodiment, the processor 110 is configure determine the number of pictures, compare the number, output the picture and mark the picture after decoding the current picture.

In an embodiment, the processor 110 is preferably configured to store the decoded current picture in the DPB 125 and mark the decoded current picture as needed for output or as not needed for output as previously disclosed herein.

The processor 110 is, in an implementation embodiment, preferably configured to compare the number against a value sps_max_num_reorder_pics[HighestTid]. In this implementation embodiment, the processor 110 is configured to output a picture in the DPB 125 with a smallest value of PicOrderCntVal of all pictures in DPB 125 that are marked as needed for output if the number is greater than the value sps_max_num_reorder_pics[HighestTid].

In another implementation embodiment, the current picture is a random access picture of the video sequence. In such a case, the processor 110 is optionally configured to parse the slice header 12 of the random access picture to obtain a value of a no_output_prior_pics_flag flag. The processor 110 is then optionally configured to determine the number, compare the number, output the picture and mark the picture if the value of the no_output_prior_pics_flag flag is one.

If the video sequence is a multi-layer video sequence comprising multiple layers of pictures, where each layer of the multiple layers has an associated syntax element defining a respective value, then the processor 110 is preferably configured to select a value derived from a syntax element, preferably sps_max_num_reorder_pics, associated with a highest layer that is decoded by the decoder 100 of the multiple layers.

In an embodiment, the processor 110 is preferably configured to output a picture with smallest picture order count value of the pictures in DPB 125 that are marked as needed for output if the number is greater than the value.

In an embodiment, the processor 110 is preferably configured to output the picture before parsing a slice header of a next picture to be decoded of the video sequence.

Figure 17:
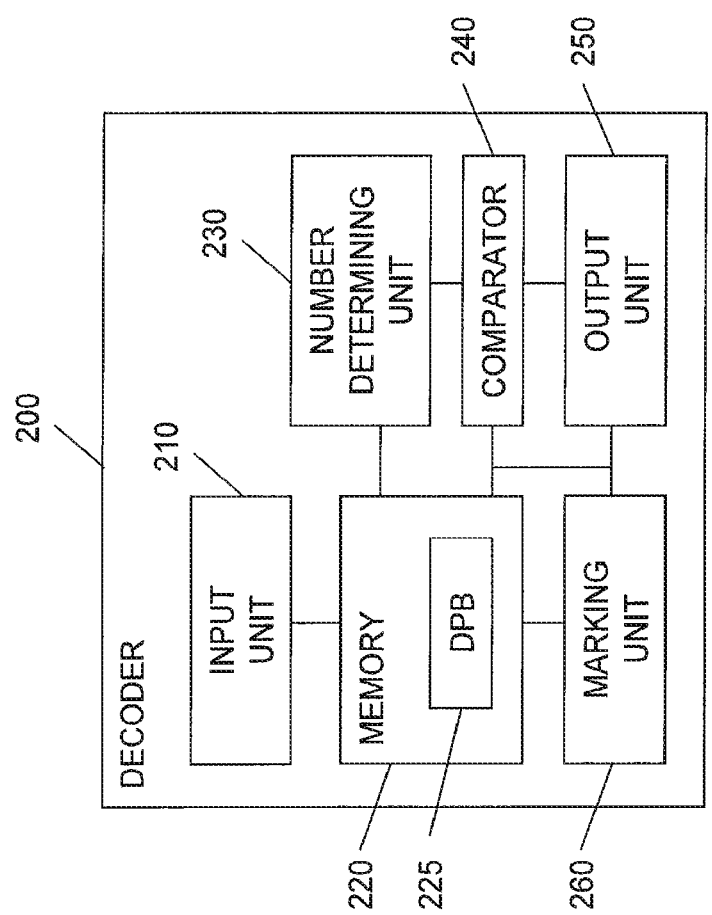
FIG. 17 is a schematic block diagram of a decoder according to another embodiment.

FIG. 17 is a schematic block diagram of another implementation example of the decoder 200. This example is in particular suitable for a hardware implementation of the decoder 200. The decoder 200 comprises an input unit 210 configured to receive the bitstream representing pictures of the video sequence and store the bitstream in a connected memory 220 comprising the DPB 225. The decoder also comprises a number determining unit 230 connected to the memory 220. This number determining unit 230 is configured to determine, after the current picture has been decoded and stored in the DPB 225, the number of pictures in the DPB 225 that are marked as needed for output. A comparator 240 is connected to the number determining unit 230 and configured to compare the number against the value sps_max_num_reorder_pics[HighesTid]. The decoder 200 also comprises an output unit 250 connected to the comparator 240 and preferably to the memory 220. The output unit 250 is configured to output the picture, which is a first picture in output order, of the pictures in the DPB 225 that are marked as needed for output if the number is greater than the value. A marking unit 260 is connected to the memory 220 and configured to mark the picture as not needed for output if the number is greater than the value.

The comparator 240 is preferably connected to the number determining unit 230 in order to receive the number of pictures determined by the number determining unit 230. Correspondingly, the output unit 250 is preferably connected to the comparator 240 in order to receive information of whether the determined number is greater than the value sps_max_num_reorder_pics[HighesTid] from the comparator 240. The marking unit 260 is preferably connected to the output unit 250 in order to receive information of which picture that was output by the output unit 250.

Figure 18:
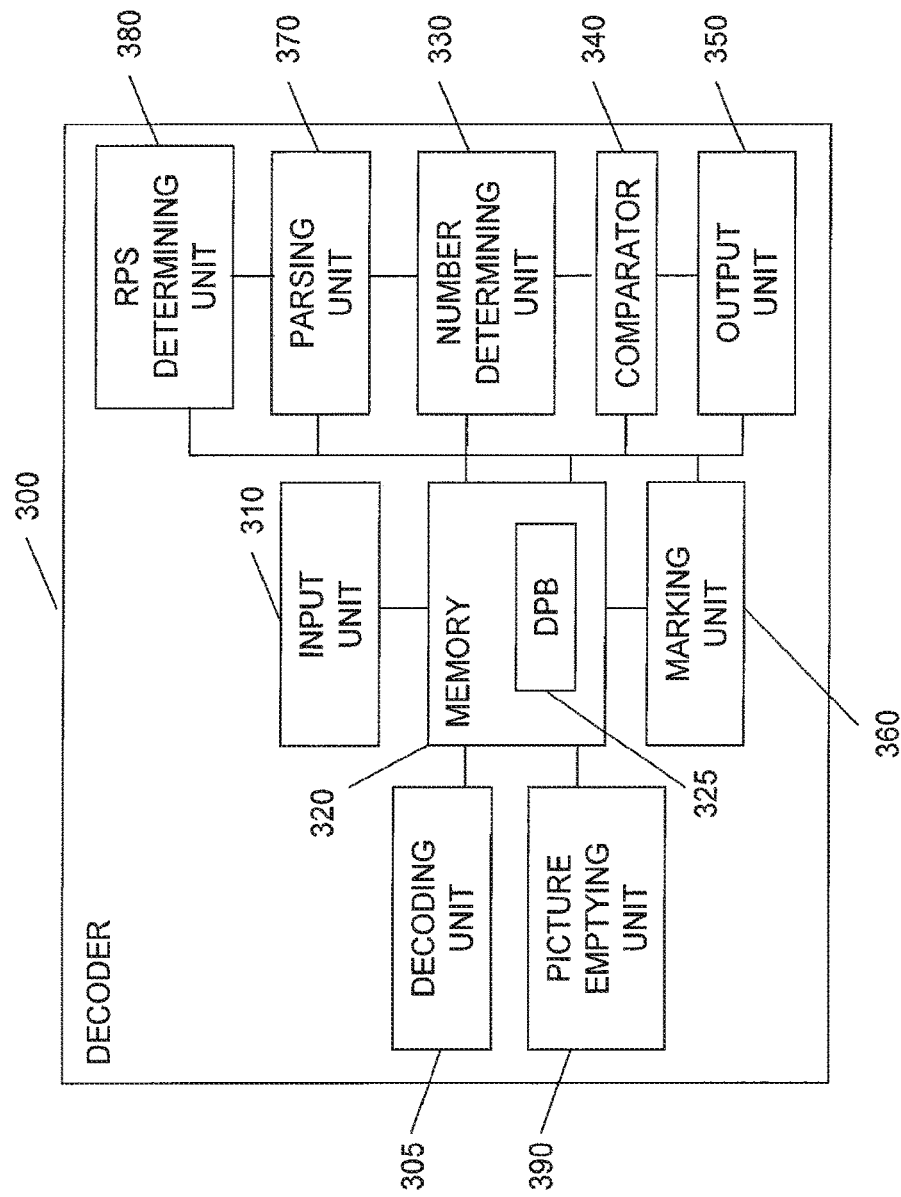
FIG. 18 is a schematic block diagram of a decoder according to a further embodiment.

FIG. 18 is a schematic block diagram of yet another implementation example of the decoder 300. This example is in particular suitable for a hardware implementation of the decoder 300. The decoder 300 comprises an input unit 310 configured to receive the bitstream representing pictures of the video sequence and store the bitstream in a connected memory 320 comprising the DPB 325. A parsing unit 370 connected to the memory 320 is configured to parse the slice header of the current picture to be decoded of the video sequence. The decoder 300 comprises a reference picture set determining unit 380 connected to the parsing unit 370 and preferably to the memory 320. The reference picture set determining unit 380 is configured determine the RPS for the current picture based on the parsed slice header. A marking unit 360 is connected to the memory 320 and configured to mark all pictures in the DPB 325 that are not present in the RPS as unused for reference. The decoder 300 also comprises an output unit 350 connected to the memory 320 and preferably to a comparator 340. The output unit 350 is configured to output zero, one or many pictures, marked as needed for output, of the pictures in the DPB 325, wherein the marking unit 360 is configured to mark the zero, one or many pictures as not needed for output. A picture emptying unit 390 is connected to the memory 320 and configured to empty or remove, from the DPB 325, any picture marked as unused for reference and not needed for output of the pictures in the DPB 325. A decoding unit 305 is connected to the memory 320 and configured to decode the current picture.

The decoder 300 of FIG. 18 also comprises a number determining unit 330 connected to the memory 320 and preferably also to the parsing unit 370 and the comparator 340. The number determining unit 330 is configured to determine the number of pictures in the DPB 325 that are marked as needed for output. The previously mentioned comparator 340 is configured to compare the number against the value derived from at least one syntax element present in the bitstream. In this embodiment the output unit 350 is also configured to output the picture, which is a first picture in output order, of the pictures in the DPB 325 that are marked as needed for output if the number is greater than the value. The marking unit 360 is also configured to mark the picture as not needed for output if the number is greater than the value.

In a preferred embodiment, the number determining unit 330 is configured to determine the number of pictures, the comparator 340 is configured to compare the number, the output unit 350 is configured to output the picture and the marking unit 360 is configured to mark the picture after the decoding unit 305 has decoded the current picture.

The reference picture set determining unit 380 is preferably connected to the parsing unit 370 in order to receive information present in the parsed slice header and used in order to determine the RPS. The reference picture set determining unit 380 is preferably also connected to the marking unit 360 in order to provide the RPS or information of the pictures listed in the RPS to the marking unit 360. The comparator 340 is preferably connected to the number determining unit 330 in order to receive the number of pictures determined by the number determining unit 330. Correspondingly, the output unit 350 is preferably connected to the comparator 340 in order to receive information of whether the determined number is greater than the value from the comparator 340. The marking unit 360 is preferably connected to the output unit 350 in order to receive information of which picture that was output by the output unit 350.

As indicated in the foregoing, the decoder may alternatively be defined as a group of function modules, where the function modules are implemented as a computer program running on a processor.

FIG. 16 is a schematic block diagram illustrating an example of a decoder 100 comprising a processor 110 and an associated memory 120.

Figure 19:
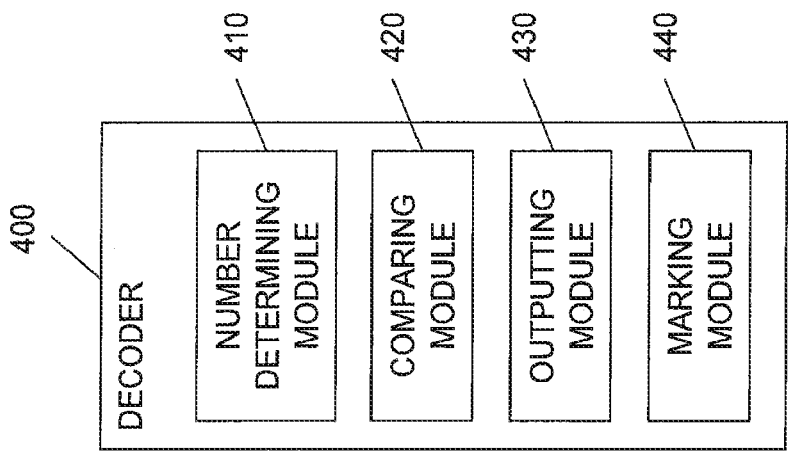
FIG. 19 is a schematic block diagram of a decoder according to yet another embodiment.

The computer program residing in memory 120 may thus be organized as appropriate function modules configured to perform, when executed by the processor 110, at least part of the steps and/or tasks described above. An example of such function modules is illustrated in FIG. 19. FIG. 19 is thereby a schematic block diagram illustrating an example of a decoder 400 comprising a group of function modules 410-440. These modules comprise a number determining module 410 for determining, after a current picture of a bitstream representing pictures of a video sequence has been decoded and stored in a DPB, a number of pictures in the DPB that are marked as needed for output. The decoder 400 also comprises a comparing module 420 for comparing the number, preferably as received from the number determining module 410, against a value sps_max_num_reorder_pics [HighesTid]. An outputting module 430 of the decoder 400 is for outputting a picture, which is a first picture in output order, of the pictures in the DPB that are marked as needed for output if the number is greater than the value, optionally but preferably as determined by the comparing module 420. The decoder 400 further comprises a marking module 440 for marking the picture as not needed for output if the number is greater than the value, optionally but preferably as determined by the comparing module 420.

FIG. 20 is a schematic block diagram illustrating another example of a decoder 500 with a group of function modules 510-580. The decoder 500 comprises a parsing module 510 for parsing a slice header of a current picture to be decoded of a bitstream representing pictures of a video sequence. A reference picture set determining module 520 of the decoder 500 is for determining a RPS for the current picture based on the slice header, preferably as parsed by the parsing module 510. The decoder 500 also comprises a marking module 530 for marking all pictures in a DPB that are not present in the RPS, optionally but preferably as determined by the reference picture set determining module 520, as unused for reference and an outputting module 540 for outputting zero, one or many pictures, marked as needed for output, of the pictures in the DPB. In an embodiment, the marking module 530 is further for marking the zero, one or many pictures as not needed for output. The decoder 500 further comprises an emptying module 550 for emptying or removing, from the DPB, any picture marked as unused for reference and not needed for output of the pictures in the DPB and a decoding module 560 for decoding the current picture. The decoder 500 additionally comprises a number determining module 560 for determining a number of pictures in the DPB that are marked as needed for output and a comparing module 570 for comparing the number, optionally but preferably as determined by the number determining module 560, against a value derived from at least one syntax element present in the bitstream.

In an embodiment, the outputting module 540 is further for outputting a picture, which is a first picture in output order, of the pictures in the DPB that are marked as needed for output if the number is greater than the value, optionally but preferably as determined by the comparing module 570. The marking module 530 is further for marking the picture as not needed for output if the number is greater than the value, optionally but preferably as determined by the comparing module 570.

In an embodiment, the number determining module 570 determining the number of pictures, the comparing module 580 comparing the number, the outputting module 540 outputting the picture and the marking module 530 marking said picture after the decoding module 560 decoding the current picture.

The embodiments of the decoder 400, 500 as shown in FIGS. 19 and 20 may optionally also be operable to perform that various implementation embodiments as previously disclosed herein, such as with reference to FIGS. 9, 10, 12-15.

In an embodiment, the computer program comprises program code which when executed by a processor 110, see FIG. 16, or computer causes the processor 110 or computer to perform the steps, functions, procedures and/or blocks described above and shown in FIGS. 8-15.

The software or computer program may be realized as a computer program product, which is normally carried or stored on a computer-readable medium. The computer-readable medium may include one or more removable or non-removable memory devices including, but not limited to a ROM, a RAM, a Compact Disc (CD), a Digital Versatile Disc (DVD), a Universal Serial Bus (USB) memory, a Hard Disk Drive (HDD) storage device, a flash memory, or any other conventional memory device. The computer program may thus be loaded into the operating memory of a computer or equivalent processing device for execution by the processing circuitry thereof.

The decoder 100, 200, 300, 400, 500 as shown in FIGS. 16-20 is preferably a HEVC-compliant decoder. It should, however, be noted that the embodiments are not limited to HEVC.

According to an aspect, a method performed by an encoder is provided. In the method, the encoder determines the number of pictures in the DPB that are marked as needed for output and compares that number against a value that is represented by syntax elements in the bitstream. If the number of pictures in the DPB marked as needed for output is greater than the value that is derived from syntax elements in the bitstream, a modified output marking process is performed or the picture of the pictures in the DPB marked as needed for output which is the first picture in output order is marked as not needed for output.

FIG. 21 is a flow chart of a method performed by an encoder according to an embodiment. The method comprises determining, in step S60 and after a current picture has been decoded and stored in a DPB, a number of pictures in the DPB that are marked as needed for output. A next step S61 comprises comparing the number against a value sps_max_num_reorder_pics[HighestTid], wherein Highest-Tid specifies a highest layer that is decoded by the encoder of a video sequence. If the number is greater than the value the method continues to step S62, which comprises marking a picture, which is a first picture in output order, of the pictures in DPB that are marked as needed for output as not needed for output.

The method as performed in the encoder in FIG. 21 is basically similar to the corresponding method performed in a matching decoder, see FIG. 8. A difference is, though, that the encoder generally does not output any pictures, which is performed in the decoder. Hence, the embodiment of the method shown in FIG. 21 preferably lacks the outputting step S3 of the corresponding method performed by a decoder in FIG. 8.

In an embodiment, when the current picture has been decoded, two markings preferably occur, one for output and one for reference. Hence, in an embodiment these markings are preferably done prior to step S60 since it affects the number of pictures that are marked as needed for output. If the current picture has a PicOutputFlag=1, the current picture is preferably counted as well.

In an embodiment, if the number is not greater than the value as determined in the comparison of step S61 the method preferably ends and no picture is marked. Thus, in such a case, step S62 is omitted and not performed, see right hatched line.

In an embodiment, steps S61-S62 of FIG. 21 could be performed only once after a current picture has been decoded and stored in the DPB. Alternatively, the loop formed by steps S61-S62, see left hatched line, could be performed until the number of pictures in the DPB that are marked as needed for output is no longer larger than the value sps_max_num_reorder_pics[HighestTid]. Each time the loop of steps S61-S62 is performed the number of pictures in the DPB that are marked as needed for output is reduced by one through the marking in step S62.

Figure 22:
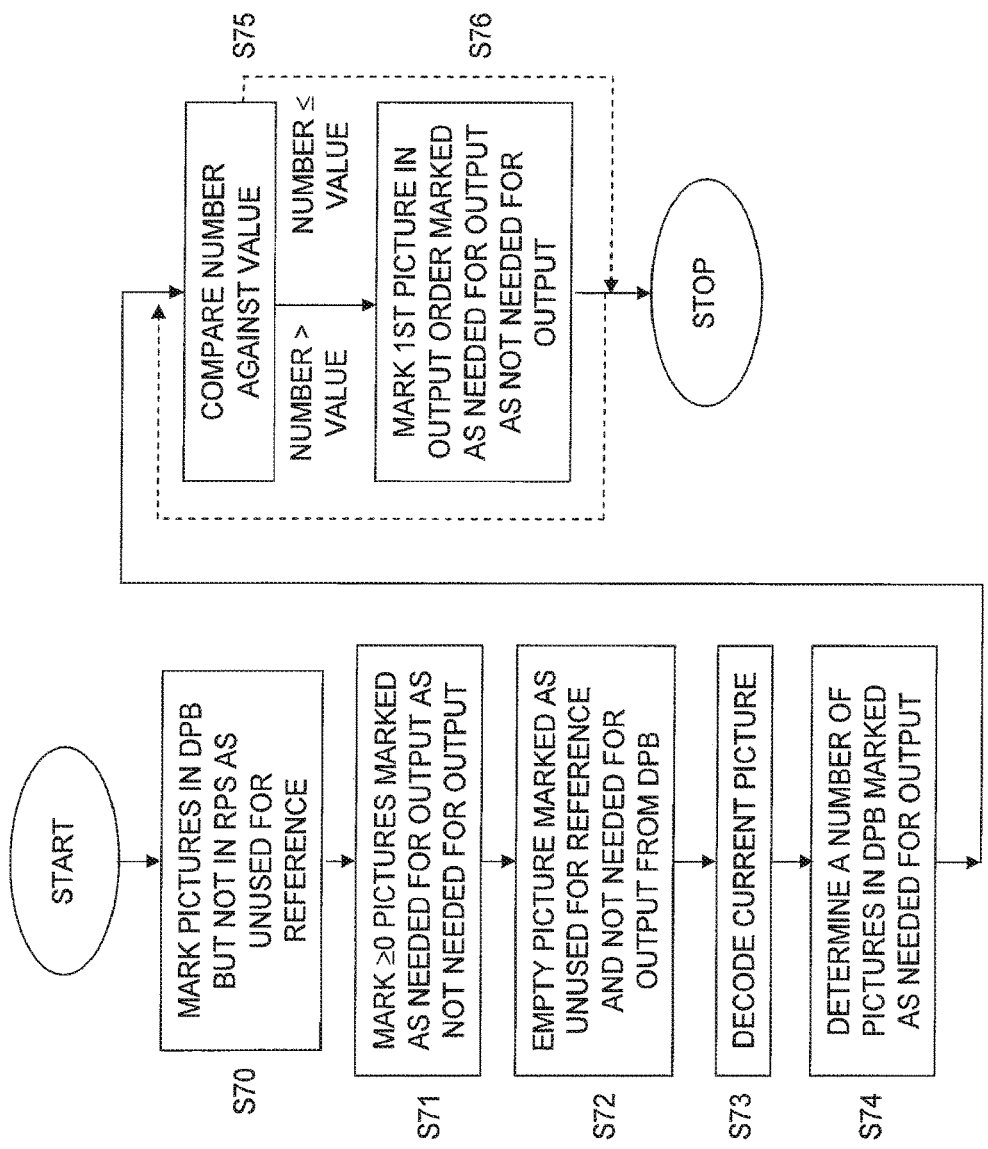
FIG. 22 is a flow chart of a method performed by an encoder according to another embodiment.

FIG. 22 is a flow chart of a method performed by an encoder according to another embodiment. The method comprises marking, in step S70, all pictures in a DPB that are not present in a RPS for a current picture of a video sequence set as unused for reference. The method also comprises marking, in step S71, zero, one or many pictures, marked as needed for output, of the pictures in DPB as not needed for output. Any picture marked as unused for reference and not needed for output of the pictures in the DPB is emptied or removed in step S72 from the DPB. A following step S73 comprises decoding the current picture. The method further comprises determining, in step S74, a number of pictures in the DPB that are marked as needed for output and comparing, in step S75, the number against a value derived from at least one defined syntax element. If this number is greater than the value the method continues to step S76, which comprises marking a picture, which is a first picture in output order, of the pictures in the DPB that are marked as needed for output as not needed for output. In a preferred embodiment, determining the number of pictures in step S74, comparing the number in step S75 and marking the picture in step S76 are performed after decoding the current picture in step S73.

The method as performed in the encoder in FIG. 22 is basically similar to the corresponding method performed in a matching decoder, see FIG. 11. A difference is, though, that the encoder generally does not output any pictures, which is performed in the decoder. Hence, the embodiment of the method shown in FIG. 22 preferably lacks the outputting steps S33 and S38 of the corresponding method performed by a decoder in FIG. 11. Furthermore, in the method of FIG. 22 the encoder does not receive any bitstream and thereby does not need to parse a slice header in order to obtain information to determine the RPS for the current picture. In clear contrast, the encoder itself generates and determines the RPS for the current picture. Hence, steps S30 and S31 of the corresponding method performed by a decoder in FIG. 11 are typically not performed by the encoder.

In an embodiment, if the number is not greater than the value as determined in the comparison of step S75 the method preferably ends and no picture is marked. Thus, in such a case, step S76 is omitted and not performed, see right hatched line.

In an embodiment, steps S75-S76 could be performed only once after a current picture has been decoded and stored in the DPB. Alternatively, the loop formed by steps S75-S76, see left hatched line, could be performed until the number of pictures in the DPB that are marked as needed for output is no longer larger than the value. Each time the loop of steps S75-S76 is performed the number of pictures in the DPB that are marked as needed for output is reduced by one through the marking in step S76.

The embodiments as discussed in the foregoing in connection with the methods performed by a decoder can also be performed by the encoder.

For instance, an encoder method may contain and/or an encoder may be configured to perform the following ordered steps according to an embodiment:

1 A picture P is encoded.
2 After the picture P is encoded, the encoder determines the number of pictures in the DPB that are marked "needed for output" and compares that number against a value that can be derived from syntax elements in the bitstream. It should be noted that this refers to the DPB in the encoder. The DPB status in the encoder and decoder is the same. The comparison in the decoder will be exactly the same. The HEVC specification specifies what the decoder will do but the encoder will have to keep track of that, i.e. the encoder does what the decoder will do.
3 If the number of pictures in the DPB marked "needed for output" is greater than the value that can be derived from syntax elements in the bitstream, the picture of the pictures in the DPB marked "needed for output" which is first in output order is marked "not needed for output". The picture may optionally be output from the encoder.
4 A next picture Q is encoded The steps, functions, procedures, modules and/or blocks described above in connection with FIGS. 21 and 22 may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or ASICs.

Alternatively, at least some of the steps, functions, procedures, modules and/or blocks described above in connection with FIGS. 21 and 22 may be implemented in software such as a computer program for execution by suitable processing circuitry including one or more processors.

The processor is capable of executing software instructions contained in a computer program stored in a computer program product e.g. in the form of the memories. The respective computer program product can be a memory being any combination of RAM and ROM. The respective memory comprises persistent storage, which, for example, can be any single one or combination of magnetic memory, optical memory, solid state memory or even remotely mounted memory.

The flow diagram or diagrams presented above and shown in FIGS. 21 and 22 may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more DSPs, one or more CPUs, video acceleration hardware, and/or any suitable programmable logic circuitry such as one or more FPGAs, or one or more PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, an encoder configured to perform the method is provided. The encoder is configured to determine, after a current picture has been decoded and stored in a DPB, a number of pictures in the DPB that are marked as needed for output. The encoder is also configured to compare the number against a value sps_max_num_reorder_pics [HighestTid]. The encoder is further configured to mark a picture, which is a first picture in output order, of the pictures in the DPB that are marked as needed for output as not needed for output if the number is greater than the value.

The encoder 600 comprises, in an embodiment, a processor 610 configured to perform the method steps previously disclosed herein, see FIG. 21. The decoder 600 may also comprise a memory 620 connected to the processor 610, see FIG. 23.

Figure 23:
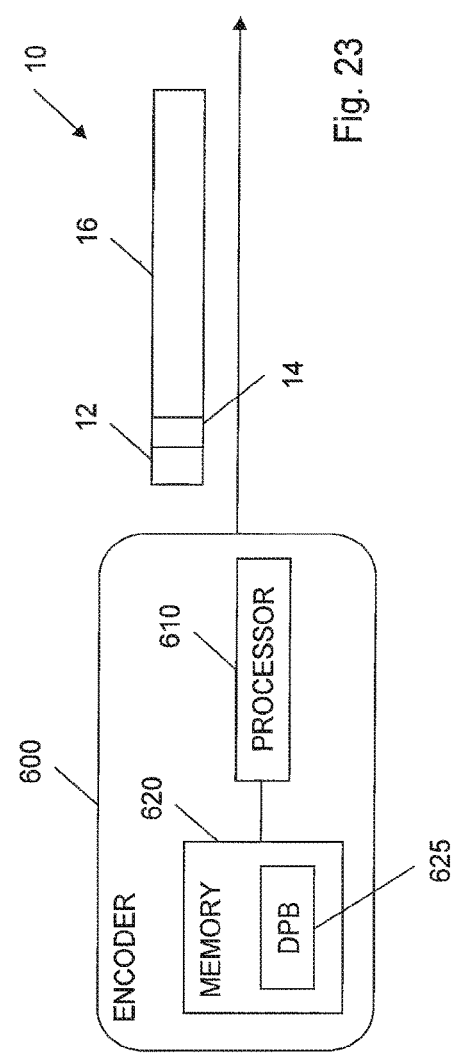
FIG. 23 is a schematic block diagram of an encoder according to an embodiment.

FIG. 23 is schematic block diagram of an encoder 600 according to an embodiment. The encoder 600 is configured to encode pictures of a video sequence into a bitstream 10. The encoder 600 comprises a processor 610 and a memory 620. The memory 620 comprises a DPB 625. In an embodiment, the processor 610 is configured to determine, after the current picture has been decoded and stored in the DPB 625, the number of pictures in the DPB 625 that are marked as needed for output. The processor 610 is also configured to compare the number against the value sps_max_num_reorder_pics[HighestTid]. The processor 610 is further configured to mark the picture, which is a first picture in output order, of the pictures in the DPB 625 that are marked as needed for output as not needed for output if the number is greater than the value.

In FIG. 23, the encoder 600 has been illustrated as comprising a processor 610. This processor 610 could be implemented as a single processor or multiple processors, such as in the form of a processing circuitry.

FIG. 23 thereby illustrates a computer implementation of the encoder 600. In this particular example, at least some of the steps, functions, procedures, modules and/or blocks described above are implemented in a computer program, which is loaded into the memory 620 for execution by the processor 610. The processor 610 and memory 620 are interconnected to each other to enable normal software execution. An optional input/output device (not shown) may also be interconnected to the processor 610 and/or the memory 620 to enable input of pictures to be encoded and output of the bitstream 10

Another aspect of the embodiments relates to an encoder configured to mark all pictures in a DPB that are not present in a RPS for a current picture of a video sequence as unused for reference. The encoder is also configured to mark zero, one or many pictures, marked as needed for output, of the pictures in the DPB as not needed for output and empty or remove, from the DPB, any picture marked as unused for reference and not needed for output of the pictures in the DPB. The encoder is further configured to decode the current picture and determine a number of pictures in the DPB that are marked as needed for output. The encoder is additionally configured to compare the number against a value derived from at least one defined syntax element and mark a picture, which is a first picture in output order, of the pictures in the DPB that are marked as needed for output as not needed for output if the number is greater than the value. In an embodiment, the encoder is configured to determine the number of pictures, compare the number and mark the picture after decoding the current picture.

The encoder 600 comprises, in an embodiment, a processor 610 configured to perform the method steps previously disclosed herein, see FIG. 22. The decoder 600 may also comprise a memory 620 connected to the processor 610, see FIG. 23.

FIG. 23 is schematic block diagram of an encoder 600 according to an embodiment. The encoder 600 is configured to encode pictures of a video sequence into a bitstream 10. The encoder 600 comprises a processor 610 and a memory 620. The memory 620 comprises a DPB 625. In an embodiment, the processor 610 is configured to mark all pictures in the DPB 625 that are not present in the RPS for the current picture of the video sequence as unused for reference. The processor 610 is also configured to mark zero, one or many pictures, marked as needed for output, of the pictures in the DPB 625 as not needed for output. The processor 610 is further configured to empty or remove, from the DPB 625, any picture marked as unused for reference and not needed for output of the pictures in the DPB 625. In this embodiment, the processor 610 is also configured to decode the current picture and determine a number of pictures in the DPB 625 that are marked as needed for output. The processor 610 is further configured to compare the number against a value derived from at least one defined syntax element. The processor 610 is additionally configured to mark a picture, which is a first picture in output order, of the pictures in the DPB 625 that are marked as needed for output as not needed for output if the number is greater than the value. In this embodiment, the processor 610 is configured to determine the number of pictures, compare the number and mark the picture after decoding the current picture.

Figure 24:
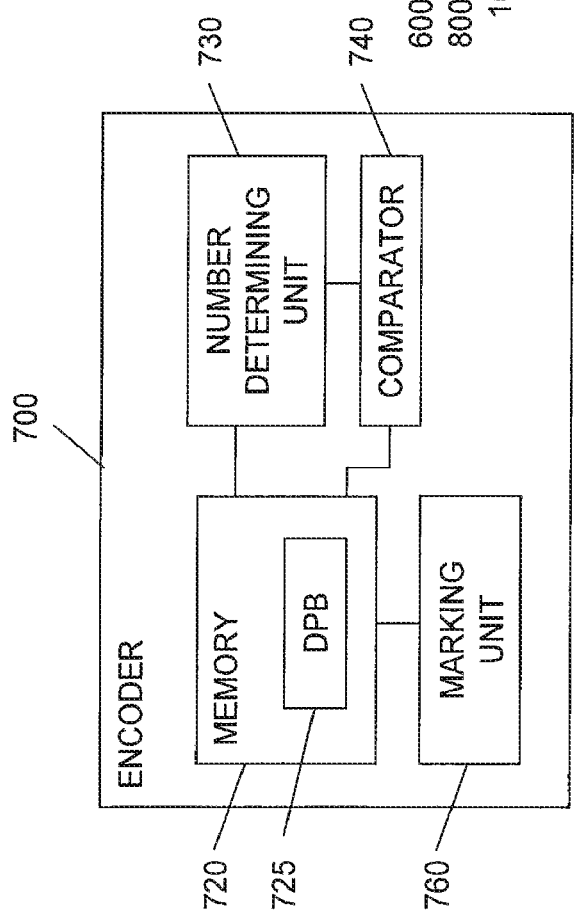
FIG. 24 is a schematic block diagram of an encoder according to another embodiment.

FIG. 24 is a schematic block diagram of another implementation example of the encoder 700. This example is in particular suitable for a hardware implementation of the encoder 700. The encoder 700 comprises a number determining unit 730 connected to a memory 720 comprising the DPB 725. The number determining unit 730 is configured to determine, after the current picture of the video sequence has been decoded and stored in the DPB 725, the number of pictures in the DPB 725 that are marked as needed for output. The encoder 700 also comprises a comparator 740 connected to the number determining unit 730 and preferably to the memory 720. The comparator 740 is configured to compare the number against the value sps_max_num_reorder_pics[HighestTid]. A marking unit 760 of the encoder is connected to the memory 720 and configured to mark the picture, which is a first picture in output order, of the pictures in the DPB 725 that are marked as needed for output as not needed for output if the number is greater than the value.

The comparator 740 is preferably connected to the number determining unit 730 in order to receive the number of pictures determined by the number determining unit 730.

FIG. 25 is a schematic block diagram of yet another implementation example of the encoder 800 in particular suitable for a hardware implementation. The encoder 800 comprises a marking unit 860 connected to a memory 820 comprising the DPB 825. The marking unit 860 is configured to i) mark all pictures in the DPB 825 that are not present in the RPS for the current picture of the video sequence as unused for reference and ii) mark zero, one or many pictures, marked as needed for output, of the pictures in the DPB 825 as not needed for output. A picture emptying unit 890 is connected to the memory 820 and is configured to empty or remove, from the DPB 825, any picture marked as unused for reference and not needed for output of the pictures in the DPB 825. The encoder 800 also comprises a decoding unit 805 connected to the memory 820 and configured to decode the current picture. A number determining unit 830 of the encoder 800 is connected to the memory 830 and is configured to determine the number of pictures in the DPB 825 that are marked as needed for output. The encoder 800 further comprises a comparator 840 connected to the number determining unit 830 and preferably to the memory 820. The comparator 840 is configured to compare the number against the value derived from at least one defined syntax element. In this embodiment, the marking unit 860 is also configured to mark the picture, which is a first picture in output order, of the pictures in DPB 825 that are marked as needed for output as not needed for output if the number is greater than the value. In a preferred embodiment, the number determining unit 830 is configured to determine the number of pictures, the comparator 840 is configured to compare the number and the marking unit 840 is configured to mark the picture after the decoding unit 805 has decoded the current picture.

The comparator 840 is preferably connected to the number determining unit 830 in order to receive the number of pictures determined by the number determining unit 830.

As indicated in the foregoing, the encoder may alternatively be defined as a group of function modules, where the function modules are implemented as a computer program running on a processor.

FIG. 23 is a schematic block diagram illustrating an example of an encoder 600 comprising a processor 610 and an associated memory 620.

Figures 26, 27:
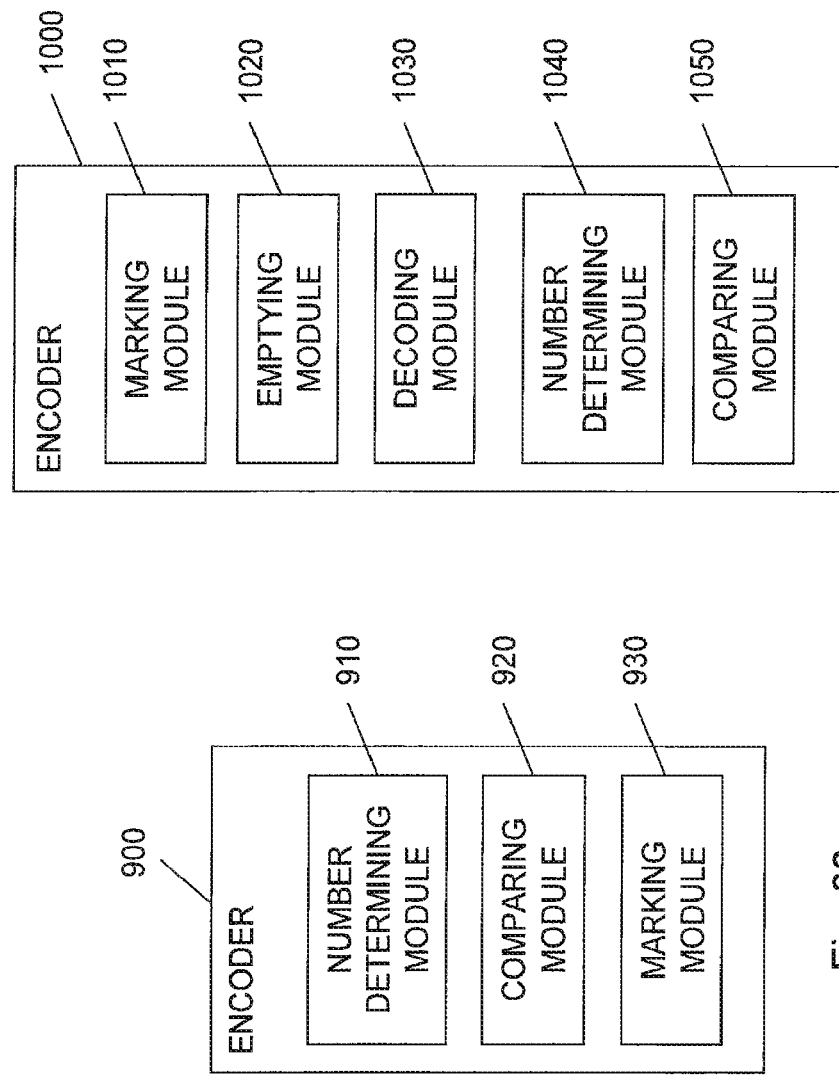
FIG. 26 is a schematic block diagram of an encoder according to yet another embodiment.
FIG. 27 is a schematic block diagram of an encoder according to a further embodiment.

The computer program residing in memory 620 may thus be organized as appropriate function modules configured to perform, when executed by the processor 610, at least part of the steps and/or tasks described above. An example of such function modules is illustrated in FIG. 26. FIG. 26 is thereby a schematic block diagram illustrating an example of an encoder 900 comprising a group of function modules 910-930. These modules comprise a number determining module 910 for determining, after a current picture of a bitstream representing pictures of a video sequence has been decoded and stored in a DPB, a number of pictures in the DPB that are marked as needed for output. The encoder 900 also comprises a comparing module 920 for comparing the number, optionally but preferably as determined by the number determining module 910, against a value sps_max_num_reorder_pics[HighesTid]. The encoder 900 further comprises a marking module 930 for marking a picture, which is a first picture in output order, of the pictures in the DPB that are marked as needed for output as not needed for output if the number is greater than the value, optionally but preferably as determined by the comparing module 920.

FIG. 27 is a schematic block diagram illustrating another example of an encoder 1000 with a group of function modules 1000-1050. The encoder 1000 comprises a marking module 1010 for marking all pictures in a DPB that are not present in a RPS set for a current picture of a video sequence as unused for reference and marking zero, one or many pictures, marked as needed for output, of the pictures in the DPB as not needed for output. The encoder 1000 further comprises an emptying module 1020 for emptying or removing, from the DPB, any picture marked as unused for reference and not needed for output of the pictures in the DPB and a decoding module 1030 for decoding the current picture. The encoder 1000 additionally comprises a number determining module 1040 for determining a number of pictures in the DPB that are marked as needed for output and a comparing module 1050 for comparing the number, optionally but preferably as determined by the number determining module 1040, against a value derived from at least one syntax element present in the bitstream.

In an embodiment, the marking module 1010 is further for marking the picture, which is a first picture in output order, of the pictures in the DPB that are marked as needed for output as not needed for output if the number is greater than the value, optionally but preferably as determined by the comparing module 1050.

In an embodiment, the number determining module 1040 determining the number of pictures, the comparing module 1050 comparing the number and the marking module 1010 marking said picture after the decoding module 1030 decoding the current picture.

In an embodiment, the computer program comprises program code which when executed by a processor 610, see FIG. 23, or computer causes the processor 610 or computer to perform the steps, functions, procedures and/or blocks described above and shown in FIG. 21 or 22.

The software or computer program may be realized as a computer program product, which is normally carried or stored on a computer-readable medium. The computer-readable medium may include one or more removable or non-removable memory devices including, but not limited to a ROM, a RAM, a CD, a DVD, a USB memory, a HDD storage device, a flash memory, or any other conventional memory device. The computer program may thus be loaded into the operating memory of a computer or equivalent processing device for execution by the processing circuitry thereof.

The encoder 600, 700, 800, 900, 1000 as shown in FIGS. 23-27 is preferably a HEVC-compliant encoder. It should, however, be noted that the embodiments are not limited to HEVC.

The decoder 100, 200, 300, 400, 500 in any of FIGS. 16-20 and the encoder 600, 700, 800, 900, 1000 in any of FIGS. 23-27 may be implemented, e.g. in a mobile terminal. For instance, the decoder 100, 200, 300, 400, 500 may, for example, be located in a receiver in a video camera or any other device for displaying a video stream. The encoder 600, 700, 800, 900, 1000 may, for example, be located in a transmitter in a video camera in e.g. a mobile device.

Figure 28:
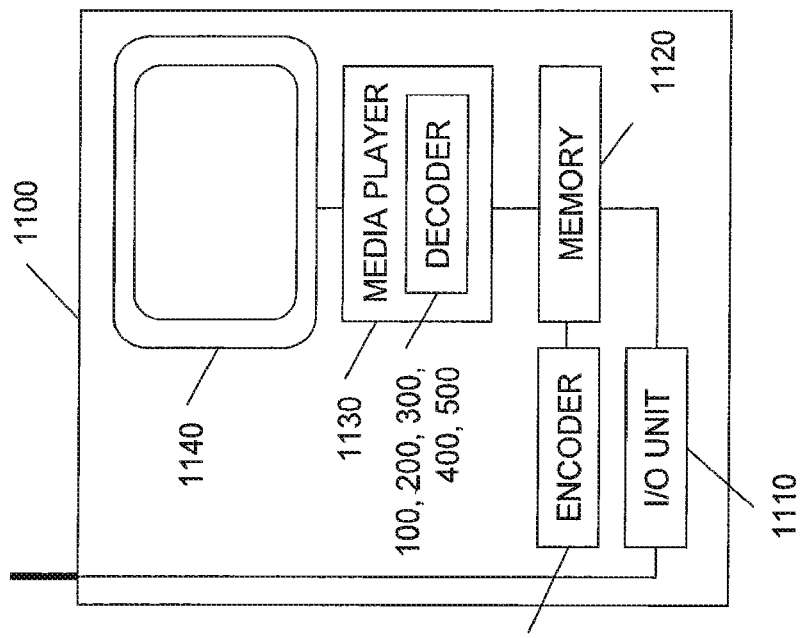
FIG. 28 is a schematic block diagram of a mobile terminal according to an embodiment.

FIG. 28 is a schematic block diagram of a mobile terminal 1100 according to an embodiment. The mobile terminal 1100 comprises a decoder 100, 200, 300, 400, 500 according to the embodiments and/or an encoder 600, 700, 800, 900, 1000 according to the embodiments, such as a decoder as shown in any of FIGS. 16-20 and/or an encoder as shown in any of FIGS. 23-27.

The mobile terminal 1100 preferably also comprises an input and output (I/O) unit 1110 for enabling communication, typically wireless communication but alternatively, or in addition, wired communication, with external units. The I/O unit 1110 could be implemented as a transmitter and a receiver, or a transceiver, for wireless communication. Alternatively, the I/O unit 1110 could be a general I/O unit or port 1110 capable of conducting wired communication. If the mobile terminal 1100 is implemented with an encoder 600, 700, 800, 900, 1000, the I/O unit 1110 is preferably configured to transmit or output a bitstream representing a coded video sequence as generated by the encoder 600, 700, 800, 900, 1000. Correspondingly, if the mobile terminal 1100 comprises a decoder 100, 200, 300, 400, 500, the I/O unit 1110 is preferably configured to receive or input a bitstream representing a coded video sequence.

The mobile terminal 1100 comprises a memory 1120 configured to store coded pictures of a coded video sequence. These coded pictures can have been generated by the mobile terminal 1100 itself. In such a case, the mobile terminal 1100 preferably comprises a media engine or recorder (not shown) together with a connected encoder 600, 700, 800, 900, 1000. Alternatively, the coded video sequence is generated by some other device and transmitted to the mobile terminal 1100.

The coded pictures are brought from the memory 1120 to a decoder 100, 200, 300, 400, 500. The decoder 100, 200, 300, 400, 500 then decodes the coded pictures into decoded pictures. The decoded pictures are provided to a media player 1130 that is configured to render the decoded pictures of the video sequence into video data that is displayable on a display or screen 1140 of or connected to the mobile terminal 1100.

In FIG. 28, the mobile terminal 1100 has been illustrated as comprising both the decoder 100, 200, 300, 400, 500 and the media player 1130, with the decoder 100, 200, 300, 400, 500 implemented as a part of the media player 1130. This should, however, merely be seen as an illustrative but non-limiting example of an implementation embodiment for the mobile terminal 1100. Also distributed implementations are possible where the decoder 100, 200, 300, 400, 500 and the media player 1130 are provided in two physically separated devices are possible and within the scope of mobile terminal 1100 as used herein. The display 1140 could also be provided as a separate device connected to the mobile terminal 1100, where the actual data processing is taking place.

The mobile terminal 1100 can be any device having media decoding functions that operates on a coded video sequence of coded pictures to thereby decode the pictures and make the video data available. Non-limiting examples of such mobile terminals 1100 include mobile telephones and other portable media players, computers, decoders, game consoles, etc.

The encoder 600, 700, 800, 900, 1000 of the embodiments, such as shown in any of FIGS. 23-27, and/or the decoder 100, 200, 300, 400, 500 of the embodiments, such as shown in any of FIGS. 16-20, may be implemented in a network node 2 as shown in FIG. 29.

As illustrated in FIG. 29, the encoder 600, 700, 800, 900, 1000 and/or decoder 100, 200, 300, 400, 500 may be implemented in a network node 2 in a communication network 1 between a sending unit 3 and a receiving unit 4. Such a network node 2 may be a device for converting video between, for instance, different video resolutions, frame rates, qualities, bit rates, and coding standards. The network node 2 can be in the form of a radio base station, a Node-B or any other network node in a communication network 1, such as a radio-based network.

The encoder and/or decoder of the embodiments may also be provided in any element that operates on a bitstream, such as a Media Aware Network Element.

The embodiments are not limited to HEVC but may be applied to any extension of HEVC, such as a scalable extension or multiview extension, or to a difference video codec.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electronic device that processes video, the electronic device comprising:
a video decoder configured to:
determine, after a current picture of a bitstream representing pictures of a multi-layer video sequence comprising multiple layers of pictures has been decoded, a number of pictures in a decoded picture buffer that are marked as needed for output, the current picture belonging to a layer other than a highest layer of the multi-layer video sequence that is decoded by the video decoder;
to select a value sps_max_num_reorder_pics[HighestTid], wherein HighestTid specifies the highest layer, and the value sps_max_num_reorder_pics[HighestTid] is derived from a syntax element associated with the highest layer, each layer i of the multiple layers has an associated syntax element defining a respective value sps_max_num_reorder_pics[i], and the value sps_max_num_reorder_pics[i] indicates a maximum allowed number of pictures that can precede any picture in the multi-layer video sequence in decoding order and follow that picture in output order when HighestTid is equal to i;
output a picture, which is a first picture in output order of the pictures in the decoded picture buffer that are marked as needed for output, if the number of pictures in the decoded picture buffer that are marked as needed for output has a defined relationship relative to the value sps_max_num_reorder_pics[HighestTid]; and
mark the picture as not needed for output if the number of pictures in the decoded picture buffer that are marked as needed for output has the defined relationship relative to the value sps_max_num_reorder_pics[HighestTid].

2. The electronic device according to claim 1, wherein the defined relationship is for the number of pictures in the decoded picture buffer that are marked as needed for output to be greater than the value sps_max_num_reorder_pics[HighestTid].

3. The electronic device according to claim 1, wherein the determination of the number of pictures in the decoded picture buffer that are marked as needed for output, is performed after the current picture has been stored in the decoded picture buffer.

4. The electronic device according to claim 1, wherein the video decoder comprises:
electronic circuits configured to:
determine, after the current picture has been decoded, the number of pictures in the decoded picture buffer that are marked as needed for output;
select the value sps_max_num_reorder_pics[HighestTid];
output the picture, which is the first picture in output order, of the pictures in the decoded picture buffer that are marked as needed for output if the number of pictures in the decoded picture buffer that are marked as needed for output has the defined relationship relative to the value sps_max_num_reorder_pics[HighestTid]; and
mark the picture as not needed for output if the number of pictures in the decoded picture buffer that are marked as needed for output has a defined relationship relative to the value sps_max_num_reorder_pics[HighestTid].

5. The electronic device according to claim 4, wherein the electronic circuits comprise:
at least one processor; and
at least one memory comprising the decoded picture buffer, wherein the at least one processor executes program code in the at least one memory to be configured to:
determine, after the current picture has been decoded, the number of pictures in the decoded picture buffer that are marked as needed for output;
select the value sps_max_num_reorder_pics[HighestTid];
output the picture, which is the first picture in output order, of the pictures in the decoded picture buffer that are marked as needed for output if the number of pictures in the decoded picture buffer that are marked as needed for output has the defined relationship relative to the value sps_max_num_reorder_pics[HighestTid]; and
mark the picture as not needed for output if the number of pictures in the decoded picture buffer that are marked as needed for output has the defined relationship relative to the value sps_max_num_reorder_pics[HighestTid].

6. The electronic device according to claim 1, wherein the video decoder is further configured to:
store the decoded current picture in the decoded picture buffer; and
mark the decoded current picture as needed for output or as not needed for output.

7. The electronic device according to claim 1, wherein the video decoder is further configured to:
output a picture in the decoded picture buffer with a smallest value of PicOrderCntVal of all pictures in the decoded picture buffer that are marked as needed for output if the number of pictures in the decoded picture buffer that are marked as needed for output has the defined relationship relative to the value sps_max_num_reorder_pics[HighestTid], wherein PicOrderCntVal represents a picture order count value.

8. The electronic device according to claim 1, wherein the video decoder is further configured to output a picture with smallest picture order count value of the pictures in the decoded picture buffer that are marked as needed for output if the number of pictures in the decoded picture buffer that are marked as needed for output has the defined relationship relative to the value sps_max_num_reorder_pics[HighestTid].

9. The electronic device according to claim 1, wherein the video decoder is further configured to output the picture before parsing a slice header of a next picture to be decoded of the multi-layer video sequence.

10. The electronic device according to claim 1, wherein the video decoder is further configured to:
parse a slice header of the current picture to be decoded of the multi-layer video sequence;
determine a reference picture set for the current picture based on the parsed slice header;
mark all pictures in the decoded picture buffer that are not present in the reference picture set as unused for reference;
output zero, one or many pictures, marked as needed for output, of the pictures in the decoded picture buffer and mark the zero, one or many pictures as not needed for output;
empty, from the decoded picture buffer, any picture marked as unused for reference and not needed for output of the pictures in the decoded picture buffer; and
decode the current picture, wherein the processor is configured to determine the number of pictures, output the picture and mark the picture after decoding the current picture.

11. The electronic device according to claim 10, wherein the video decoder outputs the picture before parsing a slice header of a next picture to be decoded of the multi-layer video sequence.

12. The electronic device according to claim 1, wherein the video decoder outputs a picture in the decoded picture buffer with a smallest value of PicOrderCntVal of all pictures in the decoded picture buffer that are marked as needed for output if the number of pictures in the decoded picture buffer that are marked as needed for output has the defined relationship relative to the value sps_max_num_reorder_pics[HighestTid], wherein PicOrderCntVal represents a picture order count value.

13. The electronic device according to claim 1, wherein the video decoder outputs a picture with smallest picture order count value of the pictures in the decoded picture buffer that are marked as needed for output if the number of pictures in the decoded picture buffer that are marked as needed for output has the defined relationship relative to the value sps_max_num_reorder_pics[HighestTid].

14. The electronic device according to claim 1, wherein the video decoder is a High Efficiency Video Coding, HEVC, compliant video decoder.

15. The electronic device according to claim 1, wherein the electronic device comprises a mobile terminal.

16. The electronic device according to claim 1, wherein the electronic device comprises a media player.

17. An electronic device that processes video, the electronic device comprising:
an encoder configured to:
determine, after a current picture of a bitstream representing pictures of a multi-layer video sequence comprising multiple layers of pictures has been decoded, a number of pictures in a decoded picture buffer that are marked as needed for output, the current picture belonging to a layer other a highest layer of the multi-layer video sequence that is decoded by the video encoder;
select a value sps_max_num_reorder_pics[HighestTid], wherein HighestTid specifies the highest layer, each layer i of the multiple layers has an associated value sps_max_num_reorder_pics[i], and the value sps_max_num_reorder_pics[i] indicates a maximum allowed number of pictures that can precede any picture in the multi-layer video sequence in decoding order and follow that picture in output order when HighestTid is equal to i; and
mark a picture, which is a first picture in output order, of the pictures in the decoded picture buffer that are marked as needed for output as not needed for output if the number of pictures in the decoded picture buffer that are marked as needed for output has the defined relationship relative to the value sps_max_num_reorder_pics[HighestTid].

18. The electronic device according to claim 17, wherein the defined relationship is for the number of pictures in the decoded picture buffer that are marked as needed for output to be greater than the value sps_max_num_reorder_pics[HighestTid].

19. The electronic device according to claim 17, wherein the determination of the number of pictures in the decoded picture buffer that are marked as needed for output, is performed after the current picture has been stored in the decoded picture buffer.

20. The electronic device according to claim 17, wherein the video encoder comprises:
electronic circuits configured to:
determine, after the current picture has been decoded, the number of pictures in the decoded picture buffer that are marked as needed for output;
select the value sps_max_num_reorder_pics[HighestTid]; and
mark the picture as not needed for output if the number of pictures in the decoded picture buffer that are marked as needed for output has the defined relationship relative to the value sps_max_num_reorder_pics[HighestTid].

21. The electronic device according to claim 20, wherein the electronic circuits comprise:
- at least one processor; and
- at least one memory comprising the decoded picture buffer, wherein the at least one processor executes program code in the at least one memory to be configured to:
    - determine, after the current picture has been decoded, the number of pictures in the decoded picture buffer that are marked as needed for output;
    - select the value sps_max_num_reorder_pics[HighestTid]; and
    - mark the picture, which is a first picture in output order, of the pictures in the decoded picture buffer that are marked as needed for output as not needed for output if the number of pictures in the decoded picture buffer that are marked as needed for output has the defined relationship relative to the value sps_max_num_reorder_pics[HighestTid].

22. The electronic device according to claim 17, wherein the video encoder is further configured to:
- mark all pictures in the decoded picture buffer that are not present in a reference picture set for the current picture of the multi-layer video sequence as unused for reference;
- mark zero, one or many pictures, marked as needed for output, of the pictures in the decoded picture buffer as not needed for output;
- empty, from the decoded picture buffer, any picture marked as unused for reference and not needed for output of the pictures in the decoded picture buffer;
- decode the current picture.

23. The electronic device according to claim 17, wherein the video encoder is a High Efficiency Video Coding, HEVC, compliant video encoder.

* * * * *

UNITED STATES PATENT AND TRADEMARK OFFICE
CERTIFICATE OF CORRECTION

| | | |
|---|---|---|
| PATENT NO. | : 9,848,203 B2 | Page 1 of 3 |
| APPLICATION NO. | : 15/609173 | |
| DATED | : December 19, 2017 | |
| INVENTOR(S) | : Samuelsson et al. | |

It is certified that error appears in the above-identified patent and that said Letters Patent is hereby corrected as shown below:

On the Title Page

In Item (73), under "Assignee", in Column 1, Line 1, delete "TELEFONAKTIEBOLAGETG" and insert -- TELEFONAKTIEBOLAGET --, therefor.

In Item (57), under "ABSTRACT", in Column 2, Line 6, delete "form" and insert -- from --, therefor.

In Item (57), under "ABSTRACT", in Column 2, Line 9, delete "value a" and insert -- value of a --, therefor.

On Page 2, in Item (56), under "OTHER PUBLICATIONS", in Column 2, Line 8, delete "2016)." and insert -- 2016. --, therefor.

On Page 2, in Item (56), under "OTHER PUBLICATIONS", in Column 2, Line 11, delete "W P3" and insert -- WP3 --, therefor.

On Page 2, in Item (56), under "OTHER PUBLICATIONS", in Column 2, Line 12, delete "Shaghai," and insert -- Shanghai, --, therefor.

On Page 2, in Item (56), under "OTHER PUBLICATIONS", in Column 2, Line 25, delete "SG.16)," and insert -- SG16), --, therefor.

On Page 2, in Item (56), under "OTHER PUBLICATIONS", in Column 2, Line 27, delete "(for further" and insert -- for further --, therefor.

In the Specification

In Column 1, Line 8, delete "2015," and insert -- 2015, (now U.S. Pat. No. 9,706,225), --, therefor.

In Column 2, Line 24, delete "narked" and insert -- marked --, therefor.

Signed and Sealed this
Eleventh Day of December, 2018

Andrei Iancu
*Director of the United States Patent and Trademark Office*

CERTIFICATE OF CORRECTION (continued)
U.S. Pat. No. 9,848,203 B2

In Column 3, Line 33, delete "Section" and insert -- Sector --, therefor.

In Column 19, Line 35, delete "decoded" and insert -- decoded. --, therefor.

In Column 20, Line 30, delete "CPB." and insert -- DPB. --, therefor.

In Column 20, Line 63, delete "CPB." and insert -- DPB. --, therefor.

In Column 22, Line 1, delete "CPB" and insert -- DPB --, therefor.

In Column 22, Line 35, delete "kin" and insert -- k in --, therefor.

In Column 22, Line 40, delete "CPB" and insert -- DPB --, therefor.

In Column 22, Line 42, delete "$t_{o,dpb}(k)<=t_r(m)$" and insert -- $t_{o,dpb}(k)<=t_r(m)$. --, therefor.

In Column 22, Line 61, delete "B8" and insert -- b8 --, therefor.

In Column 23, Line 14, delete "HighesTId=3" and insert -- HighestTid=3 --, therefor.

In Column 23, Line 26, delete "HighesTid" and insert -- HighestTid --, therefor.

In Column 25, Line 66, delete "encoder 100" and insert -- decoder 100 --, therefor.

In Column 26, Line 2, delete "encoder 100" and insert -- decoder 100 --, therefor.

In Column 27, Line 18, delete "[HighesTid]." and insert -- [HighestTid]. --, therefor.

In Column 27, Line 33, delete "[HighesTid]" and insert -- [HighestTid] --, therefor.

In Column 28, Line 59, delete "[HighesTid]." and insert -- [HighestTid]. --, therefor.

In Column 29, Lines 23-24, delete "number determining module 560" and insert -- number determining module 570 --, therefor.

In Column 29, Line 25, delete "comparing module 570" and insert -- comparing module 580 --, therefor.

In Column 29, Line 27, delete "number determining module 560," and insert -- number determining module 570, --, therefor.

In Column 29, Line 35, delete "comparing module 570." and insert -- comparing module 580. --, therefor.

In Column 29, Lines 38-39, delete "comparing module 570." and insert -- comparing module 580. --, therefor.

CERTIFICATE OF CORRECTION (continued)
U.S. Pat. No. 9,848,203 B2

In Column 32, Line 4, delete "encoded" and insert -- encoded. --, therefor.

In Column 32, Line 60, delete "decoder 600" and insert -- encoder 600 --, therefor.

In Column 32, Line 63, delete "is" and insert -- is a --, therefor.

In Column 33, Line 25, delete "bitstream 10" and insert -- bitstream 10. --, therefor.

In Column 33, Line 47, delete "decoder 600" and insert -- encoder 600 --, therefor.

In Column 33, Line 50, delete "is" and insert -- is a --, therefor.

In Column 34, Line 48, delete "memory 830" and insert -- memory 820 --, therefor.

In Column 34, Line 62, delete "marking unit 840" and insert -- marking unit 860 --, therefor.

In Column 35, Line 23, delete "[HighesTid]." and insert -- [HighestTid]. --, therefor.

In the Claims

In Column 37, Line 58, in Claim 1, delete "to select" and insert -- select --, therefor.

In Column 40, Line 23, in Claim 17, delete "other a" and insert -- other than a --, therefor.